United States Patent
Korrapati et al.

(10) Patent No.: US 10,440,579 B1
(45) Date of Patent: Oct. 8, 2019

(54) INTERNET OF THINGS LOCATION SPOOFING DETECTION

(71) Applicant: Verizon Patent and Licensing Inc., Arlington, VA (US)

(72) Inventors: Sudhir Korrapati, Acton, MA (US); Carl Wang, Syosset, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/108,941

(22) Filed: Aug. 22, 2018

(51) Int. Cl.
*H04W 12/12* (2009.01)
*H04W 4/02* (2018.01)
*H04L 12/24* (2006.01)
*H04W 64/00* (2009.01)

(52) U.S. Cl.
CPC ......... *H04W 12/12* (2013.01); *H04L 41/0813* (2013.01); *H04W 4/025* (2013.01); *H04W 64/003* (2013.01)

(58) Field of Classification Search
CPC ....... H04W 4/02; H04W 4/021; H04W 4/029; H04W 64/00; H04W 64/003; H04W 4/023; H04W 4/027; H04W 4/70; H04W 4/025; H04W 4/043; H04W 4/046; H04W 4/06; H04W 4/18; H04W 4/33; H04W 4/48; H04W 4/80; H04W 12/12; H04L 41/0813
See application file for complete search history.

(56) References Cited

U.S. PATENT DOCUMENTS

| 2008/0080442 | A1* | 4/2008 | Moon | H04L 12/14 370/338 |
| 2009/0075675 | A1* | 3/2009 | Kim | H04W 64/00 455/456.2 |
| 2014/0162683 | A1* | 6/2014 | Rochberger | H04W 64/00 455/456.1 |
| 2015/0199610 | A1* | 7/2015 | Hershberg | H04W 4/70 706/12 |
| 2015/0222659 | A1* | 8/2015 | Abou-Rizk | H04W 4/029 726/26 |
| 2016/0295364 | A1* | 10/2016 | Zakaria | H04W 4/023 |

* cited by examiner

*Primary Examiner* — Daniel Lai

(57) ABSTRACT

A network device receiving subscription data for Internet of Things (IoT) devices for subscribing to an IoT device cellular network service, and receives configuration data for configuring the IoT device cellular network service for the IoT devices, where the configuration data identifies a first device location determining source and a second device location determining source. The network device initiates provisioning of the IoT device cellular network service for the one or more IoT devices, receives primary location data, generated by the first device location determining source, associated with a first IoT device, and receives secondary location data, generated by the second device location determining source, associated with the first IoT device. The network device determines one of a plurality of confidence levels associated with the first IoT device being located at a primary location based on one or more confidence thresholds, the primary location data, and the secondary location data.

20 Claims, 15 Drawing Sheets

US 10,440,579 B1

INTERNET OF THINGS LOCATION SPOOFING DETECTION

BACKGROUND

The "Internet of Things" (IoT) is a network of physical devices (i.e., "things") designed for specific functions, unlike general computing devices like desktop or laptop computers. IoT devices are embedded with electronics and network connectivity that enable these devices to collect, store and exchange data. The network connectivity may include, for example, Bluetooth™ connectivity, Wi-Fi connectivity, and/or cellular network connectivity. An IoT device may additionally have computational capability, with various installed software (e.g., apps), and may also include one or more types of sensors. An IoT device may be, via the network connectivity, controlled remotely across existing network infrastructure. An IoT device may use the network connectivity to communicate with other IoT devices, or with certain nodes (e.g., a particular server or computer) across the Internet.

DETAILED DESCRIPTION OF THE PREFERRED EMBODIMENTS

The following detailed description refers to the accompanying drawings. The same reference numbers in different drawings may identify the same or similar elements.

The introduction of Long Term Evolution (LTE) Cat-M1 cellular network service enables low power wireless device connectivity to the cellular network, such as, for example, for battery powered IoT, Machine-to-Machine (M2M), or other types of User Equipment (UE) devices. The LTE Cat-M1 network service supports a coarse device location determining service based on Cat-M1 signaling with the IoT, M2M, or UE devices. The coarse device location determining service provided by the cellular network identifies the cell (i.e., cell tower) to which a particular IoT or M2M device is connected, or triangulates the particular IoT (e.g., by multiple cell towers) to obtain a rough estimate of the IoT device geo-location.

For more accurate location information, IoT, M2M, or UE devices frequently incorporate built-in Global Positioning System (GPS) hardware that relies on GPS satellite signals to determine an accurate geo-location of the IoT or M2M devices. The IoT, M2M, or UE devices may use one of these different location determining services for obtaining a current location of the devices. In devices that use GPS for determining an accurate location of the devices, however, false satellite signals may be sent to the IoT, M2M, or UE devices to cause the devices to be "spoofed" into reporting false locations.

Exemplary embodiments described herein utilize at least two different sources of location data for a given IoT device to detect location spoofing of the IoT device, and/or to determine a confidence level that indicates a likelihood that the IoT device is actually located at the geo-location indicated by the location data received from the source(s) of location data. For example, a primary location data source may be a GPS device residing in the IoT device that determines an accurate geo-location using GPS satellite signals, and the secondary location data source may be a wireless Local Area Network that determines a location of a "hotspot" from which the IoT is transmitting. As another example, the primary location data source may be the GPS device and GPS satellite signals, and the secondary location data may be a cellular network that determines a location of a cell tower with which the IoT device is communicating, or determines a geo-location of the IoT device by multiple cell towers triangulating signals from the IoT device. A platform, as described herein, uses the IoT device location data from both the primary and secondary location sources to detect location spoofing of the IoT device and/or to assign a confidence level that indicates likelihood that the IoT device is located at the primary location.

Figure 1A:
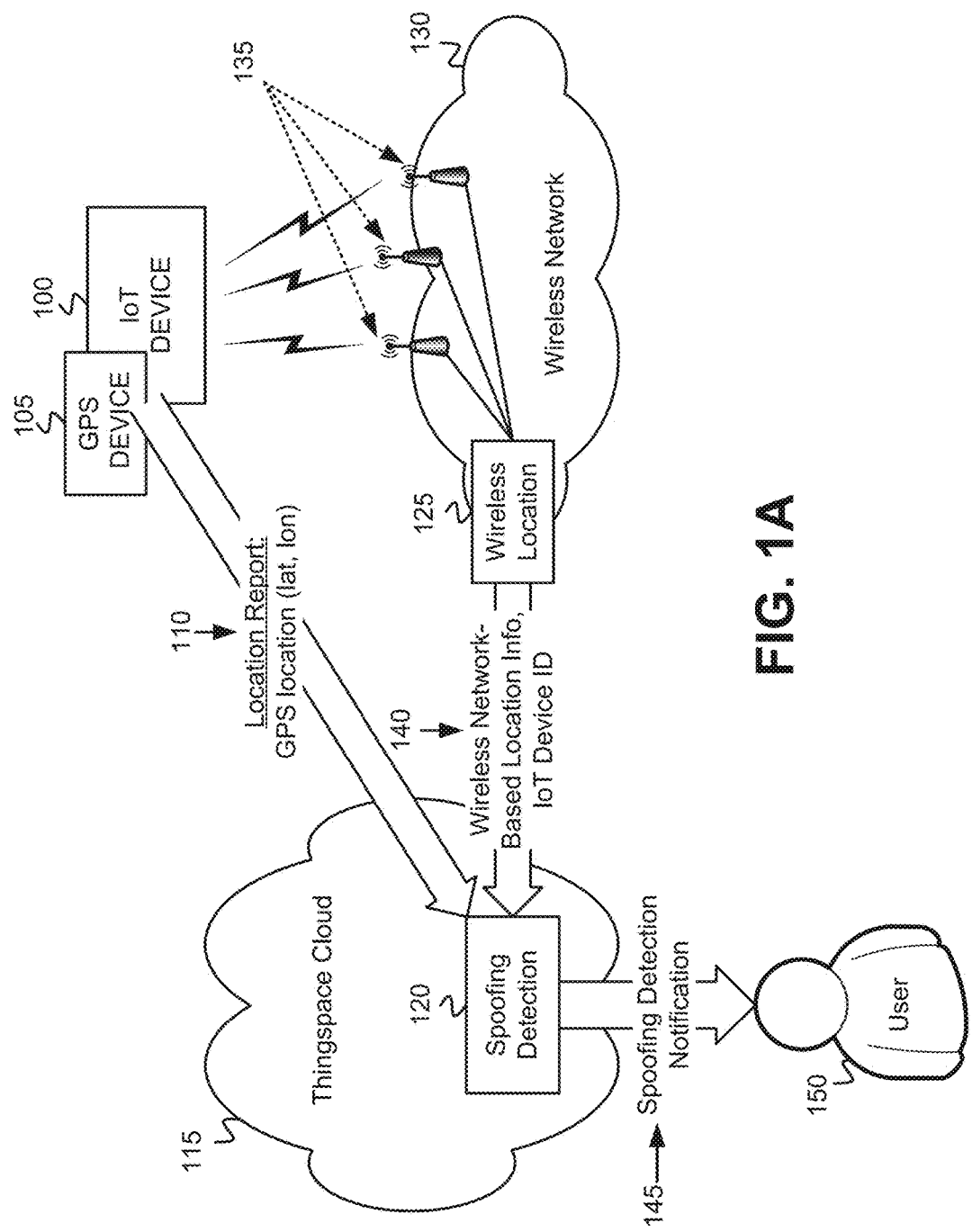
FIG. 1A illustrates an overview of exemplary IoT device location spoofing detection using primary IoT device location data and secondary IoT device location data obtained from different location determining sources.

FIG. 1A illustrates an exemplary overview of IoT device location spoofing detection using a primary IoT device location and a secondary IoT device location obtained from two different IoT location determining sources. As shown, an IoT device 100 may include a geo-location device, such as a Global Positioning System (GPS) device 105, that obtains a current geo-location of IoT device 100 as a primary IoT device location. IoT device 100 generates a location report 110, inserts the primary IoT device location in the report 110, and sends the report 110 to a platform (not shown) within a thingspace cloud 115. The platform within the thingspace cloud 115 implements a spoofing detection function 120 that receives the report 110 from IoT device 100. In one implementation, the location report 110 may be sent using a low-power and/or reduced data rate cellular data connection typically reserved for IoT and M2M devices (e.g., Long Term Evolution (LTE) Category M1 (CAT-M1)). In other implementations, other types of wired or wireless connections may be used for sending location report 110 to spoofing detection function 120.

Additionally, a wireless location function 125, implemented within a wireless network 130, determines a secondary location of IoT device 100 based on wireless communications between IoT device 100 and one or more wireless access points 135, and sends the wireless-network based location information 140 to spoofing detection function 120 in thingspace cloud 115. The wireless location function 125 determines the secondary location of the IoT device 100 using a different location determining mechanism, possibly having a different level of accuracy, then that used to determine the primary IoT device location.

In one implementation, the wireless network 130 may include a Public Land Mobile Network (PLMN), and the wireless access points 135 may include one or more cell towers. In this cellular network implementation, the wireless location determining function 125 uses signaling between IoT device 100 and at least one cell tower to determine the geo-location of IoT device 100. For example, the wireless location determining function 125 may use signaling between IoT device 100 and a connected cell tower, or multiple cell towers (e.g., three cell towers), to triangulate the geo-location of IoT device 100. In another implementation, the wireless network 130 may include a wireless local area network (WLAN), such as, for example, a Wi-Fi network (e.g., wireless LAN employing the IEEE 802.11 standard), and the wireless access points 135 may include one or more WLAN wireless access points. In this WLAN implementation, the wireless location determining function 125 uses signaling between IoT device 100 and the one or more WLAN wireless access points to determine which WLAN "hotspot" that IoT device 100 is communicating with, to determine the known geo-location of that "hotspot," and to determine if, and when, the IoT device 100 crosses from that "hotspot" to an adjacent "hotspot." By tracking movement of the IoT device 100 between WLAN "hotspots," the wireless location determining function 125 can determine a "coarse" geo-location of IoT device 100.

Upon receipt of the primary IoT device location information/data (e.g., from report 110), and the secondary IoT device location information/data (e.g., from wireless location determining function 125), spoofing detection function 120 compares the primary location information with the secondary location information to determine if the absolute value of the distance between them is greater than a certain threshold. If the absolute value is greater than the threshold, spoofing detection function 120 may indicate that the primary location information is erroneous and spoofed. Further details of exemplary implementations of location spoofing detection are described below with respect to FIG. 10. Upon detection of location spoofing, spoofing detection function 120 sends a spoofing detection notification 145 to a user/subscriber 150, that may be an owner, operator, or administrator of the IoT device 100, or a user application executed by a user device (not shown) associated with the owner, operator, or administrator of the IoT device 100.

Figure 1B:
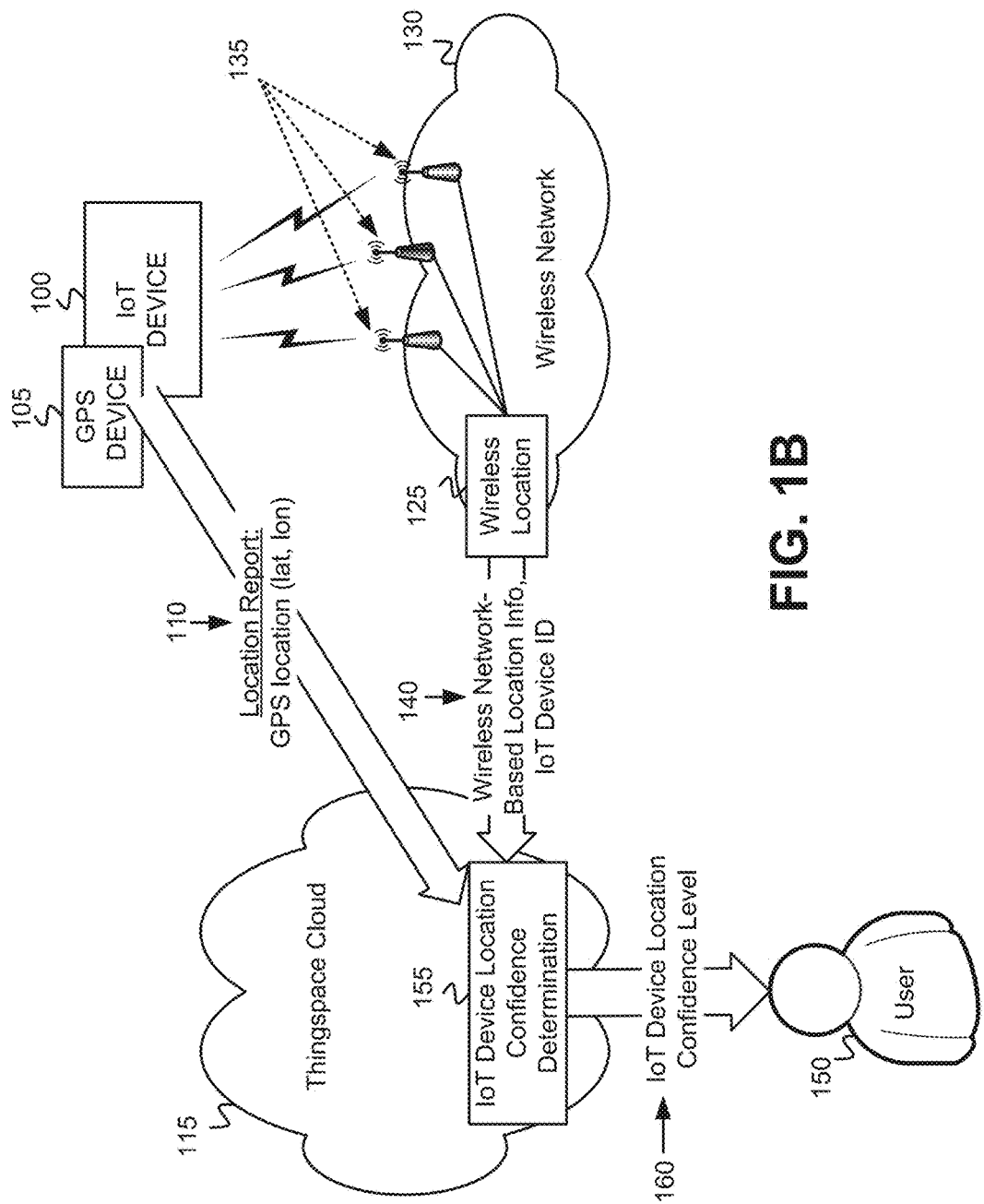
FIG. 1B illustrates an overview of exemplary IoT device location confidence determination using primary device location data and secondary device location data obtained from different location determining sources.

FIG. 1B illustrates an exemplary overview of IoT device location confidence determination using a primary IoT device location and a secondary IoT device location obtained from different IoT device location determining sources. Similar to FIG. 1A, the IoT device 100 may include a geo-location device, such as a Global Positioning System (GPS) device 105, that obtains a current geo-location of IoT device 100 as a primary IoT device location. IoT device 100 generates a location report 110, inserts the primary IoT device location in the report 110, and sends the report 110 to a platform (not shown) within a thingspace cloud 115. The platform within the thingspace cloud 115 implements an IoT device location confidence determination function 155 that receives the report 110 from IoT device 100. In one implementation, the location report 110 may be sent using a low-power and/or reduced data rate cellular data connection typically reserved for IoT and M2M devices (e.g., Long Term Evolution (LTE) Category M1 (CAT-M1)). In other implementations, other types of wired or wireless connections may be used for sending location report 110 to spoofing detection function 120. Additionally, a wireless location function 125, implemented within a wireless network 130, determines a secondary location of IoT device 100 based on wireless communications between IoT device 100 and one or more wireless access points 135, and sends the wireless-network based location information 140 to IoT device location confidence determination function 155 in thingspace cloud 115. The wireless location function 125 determines the secondary location of the IoT device 100 using a different location determining mechanism, possibly having a different level of accuracy, then that used to determine the primary IoT device location.

In one implementation, the wireless network 130 may include a PLMN, and the wireless access points 135 may include one or more cell towers. In this cellular network implementation, the wireless location determining function 125 uses signaling between IoT device 100 and at least one cell tower to determine the geo-location of IoT device 100. For example, the wireless location determining function 125 may use signaling between IoT device 100 and a connected cell tower, or multiple cell towers (e.g., three cell towers), to triangulate the geo-location of IoT device 100. In another implementation, the wireless network 130 may include a WLAN, such as, for example, a Wi-Fi network, and the wireless access points 135 may include one or more WLAN wireless access points. In this WLAN implementation, the wireless location determining function 125 uses signaling between IoT device 100 and the one or more WLAN wireless access points to determine which WLAN "hotspot" that IoT device 100 is communicating with, determine the known geo-location of that "hotspot," and determine if, and when, the IoT device 100 crosses from that "hotspot" to an adjacent "hotspot." By tracking movement of the IoT device 100 between WLAN "hotspots," the wireless location determining function 125 can determine a "coarse" geo-location of IoT device 100.

Upon receipt of the primary IoT device location information/data (e.g., from report 110), and the secondary IoT device location information/data (e.g., from wireless location determining function 125), IoT device location confidence determination function 155 determines a confidence level associated with the IoT device 100 being located at the location indicated by the primary location data. The confidence level may include one of multiple different confidence levels that indicate a likelihood that the IoT device is located at the location indicated by the primary location data. In one implementation, the multiple different confidence levels include "no confidence," "low confidence," and "high confidence" levels, described in more detail below. IoT device location confidence determination function 155, upon determining a confidence level associated with the IoT device 100 being located at the location indicated by the primary location data, sends a notification 160 to a user/subscriber 150, that may be an owner, operator, or administrator of the IoT device 100, or a user application executed by a user device (not shown) associated with the owner, operator, or administrator of the IoT device 100. The notification 160 includes the determined IoT device location confidence level, and other information, such as, for example, an identification of the IoT device 100.

Figure 2A:
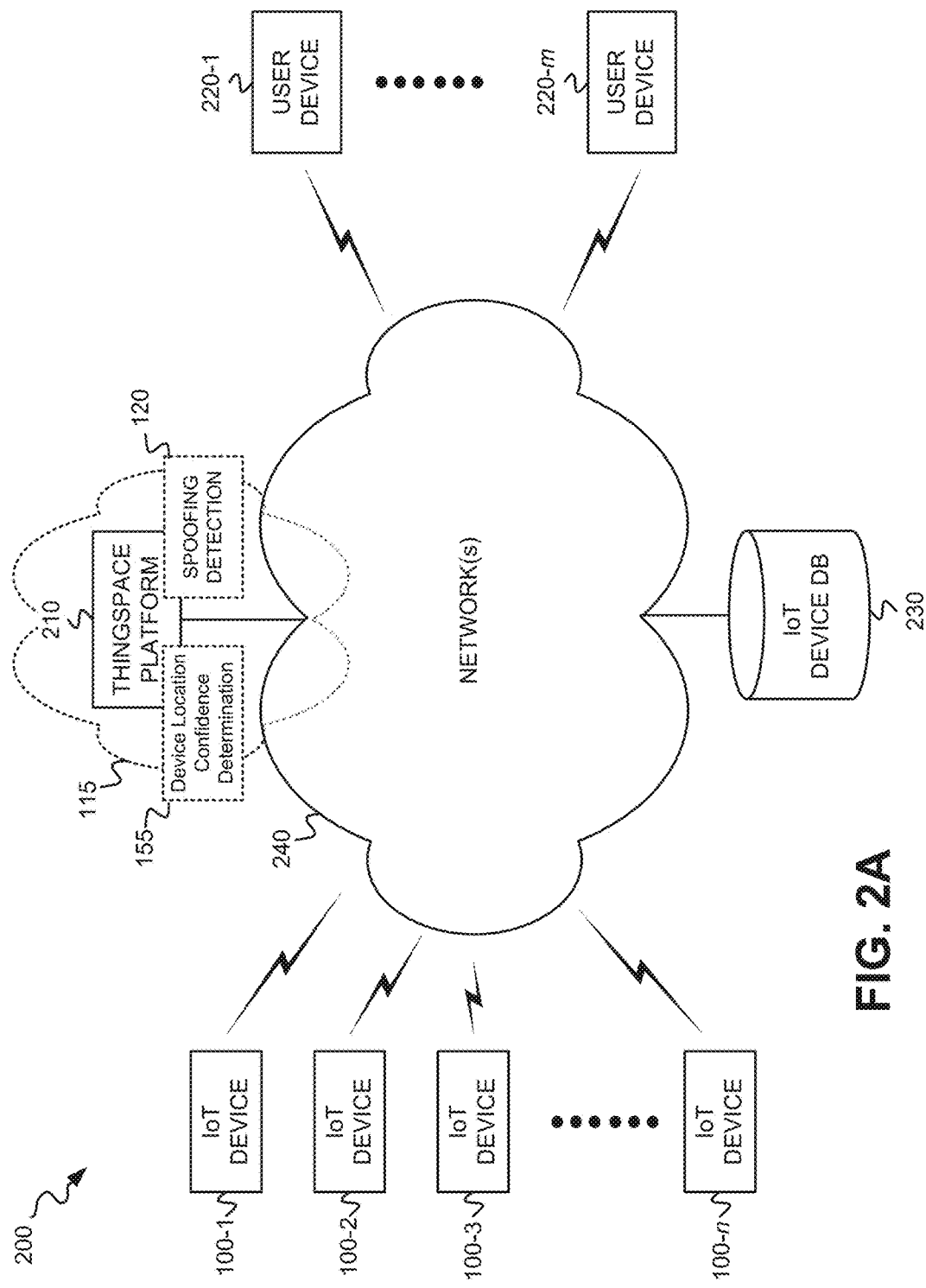
FIG. 2A illustrates an exemplary network environment in which IoT device location spoofing detection and device location confidence determination may be implemented.

FIG. 2A illustrates an exemplary network environment 200 in which IoT device location spoofing detection and device location confidence determination may be implemented. Network environment 200 may include IoT devices 100-1 through 100-*n*, a thingspace platform 210, user devices 220-1 through 220-*m*, an IoT device database (DB) 230, and a network(s) 240.

Each of IoT devices 100-1 through 100-*n* (referred to herein as "IoT device 100" or "IoT devices 100") includes a physical object or device (i.e., a "thing" or "M2M" device) that may be designed for a specific function and with which may be embedded with electronics, memory storage, and network connectivity that enables these objects or devices to collect, store and exchange data with other IoT devices, with certain network nodes, or with other devices via a PLMN of network(s) 240. Each IoT device 100's network connectivity may include, for example, Bluetooth™ connectivity, WLAN connectivity (e.g., Wi-Fi), and/or cellular network connectivity.

Thingspace platform 210 includes one or more network devices that enable a user device 220 to register and enroll the one or more of IoT devices 100-1 through 100-*n* for receiving a network service, such as, for example, a CAT-M1 IoT device communication service, via a PLMN of network(s) 240. Thingspace platform 210 may reside in thingspace cloud 115, and thingspace cloud 115 may connect to network(s) 240, or may be a portion of network(s) 240. Thingspace platform 210 may additionally implement spoofing detection function 120 and/or device location confidence determination function 155, already briefly described with respect to FIGS. 1A and 1B.

Each of user devices 220-1 through 220-*m* (referred to herein as "user device 220" or "user devices 220") includes an electronic device that further includes a communication interface (e.g., wired or wireless) for communicating via network(s) 240. User device 220 may include, for example, a cellular radiotelephone; a smart phone; a personal digital assistant (PDA); a wearable computer; a desktop, laptop, palmtop or tablet computer; or a media player. User device 220 may, however, include any type of electronic device that includes a communication interface for communicating via network(s) 240. A user 150 (not shown in FIG. 2A) may be associated with each user device 220, where the user 150 may be an owner, operator, administrator, and/or a permanent or temporary user of user device 220, or application software executed by user device 220. User 150 may additionally be an owner, operator, or administrator of one or more IoT devices 100.

IoT device DB 230 includes one or more network devices that stores data structures that enable the storage and retrieval of IoT device subscription enrollment data, and IoT location spoofing detection configuration data.

Network(s) 240 may include one or more networks of various types including, for example, a cellular public land mobile network (PLMN) (e.g., a Code Division Multiple Access (CDMA) PLMN, a Global System for Mobile Communications (GSM) PLMN, a Long Term Evolution (LTE) PLMN and/or other types of PLMNs), a satellite mobile network, a telecommunications network (e.g., Public Switched Telephone Networks (PSTNs)), a wired and/or wireless LAN, a wired and/or wireless wide area network (WAN), a metropolitan area network (MAN), an intranet, the Internet, or a cable network (e.g., an optical cable network). In one implementation, network(s) 240 may include a PLMN(s) or a satellite mobile network(s) connected to the Internet.

The configuration of the components of network environment 200 depicted in FIG. 2A is for illustrative purposes only, and other configurations may be implemented. Therefore, network environment 200 may include additional, fewer and/or different components, that may be configured differently, then depicted in FIG. 2A. For example, though a single spoofing detection function 120 and device location confidence determination function 155 are depicted in FIG. 2A, thingspace platform 210 may include multiple spoofing detection functions 120 and/or device location confidence determination functions 155 implemented by multiple, different network devices in thingspace cloud 115 (e.g., for redundancy, or load balancing).

Figure 2B:
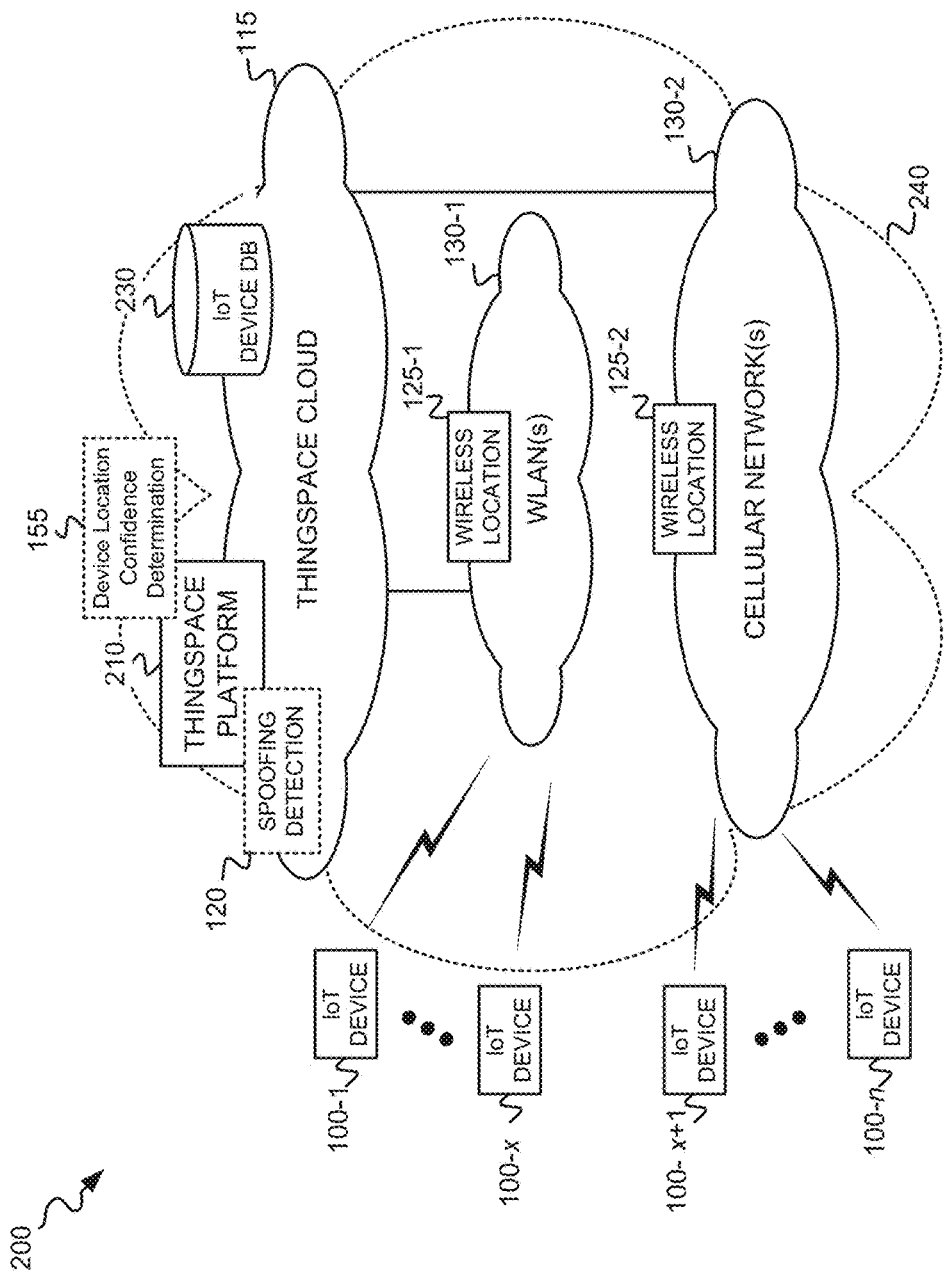
FIG. 2B depicts a portion of the network environment of FIG. 2A, according to one exemplary implementation, in which some IoT devices connect to a wireless Local Area Network, and other IoT devices connect to a cellular network.

FIG. 2B depicts a portion of the network environment 200 of FIG. 2A, according to one exemplary implementation, in which some IoT devices 100 connect to a WLAN, and other IoT devices 100 connect to a cellular network. As shown, the networks 240 of FIG. 2A may include thingspace cloud 115, a WLAN(s) 130-1, and a cellular network(s) 130-2. LAN wireless network(s) 130-1 may include one or more wireless LANs, such as, for example, one or more Wi-Fi networks or Wi-Fi "hotspots." Cellular network(s) 130-2 may include one or more cellular PLMNs or satellite mobile networks. WLAN(s) 130-1 and cellular network(s) 130-2 may connect to thingspace cloud 115 via wired or wireless links. IoT devices 100-1 through 100-*x* (where x may be less than n) may wirelessly connect to LAN wireless network(s) 130-1, and IoT devices 100-*x*+1 through 100-*n* may wirelessly connect to cellular network(s) 130-2.

A wireless location determining function 125-1 residing within WLAN(s) 130-1 may, based on wireless communications between IoT devices 100-1 through 100-*x* and LAN wireless network(s) 130-1 (and as described in further detail below), determine a geo-location of each of the IoT devices 100-1 through 100-*x* and provide the determined geo-locations to spoofing detection function 120 implemented by thingspace platform 210 in thingspace cloud 115. Thingspace platform 210 may additionally store the provided geo-locations in IoT device DB 230 in thingspace cloud 115.

A wireless location determining function 125-2 in cellular network(s) 130-2 may, based on wireless communications between IoT devices 100-*x*+1 through 100-*n* and cellular network(s) 130-2 (and as described in further detail below), determine a geo-location of each of the IoT devices 100-*x*+1 through 100-*n* and provide the determined geo-locations to the spoofing detection function 120 implemented by thingspace platform 210. Thingspace platform 210 may additionally store the provided geo-locations in IoT device DB 230.

Figure 3:
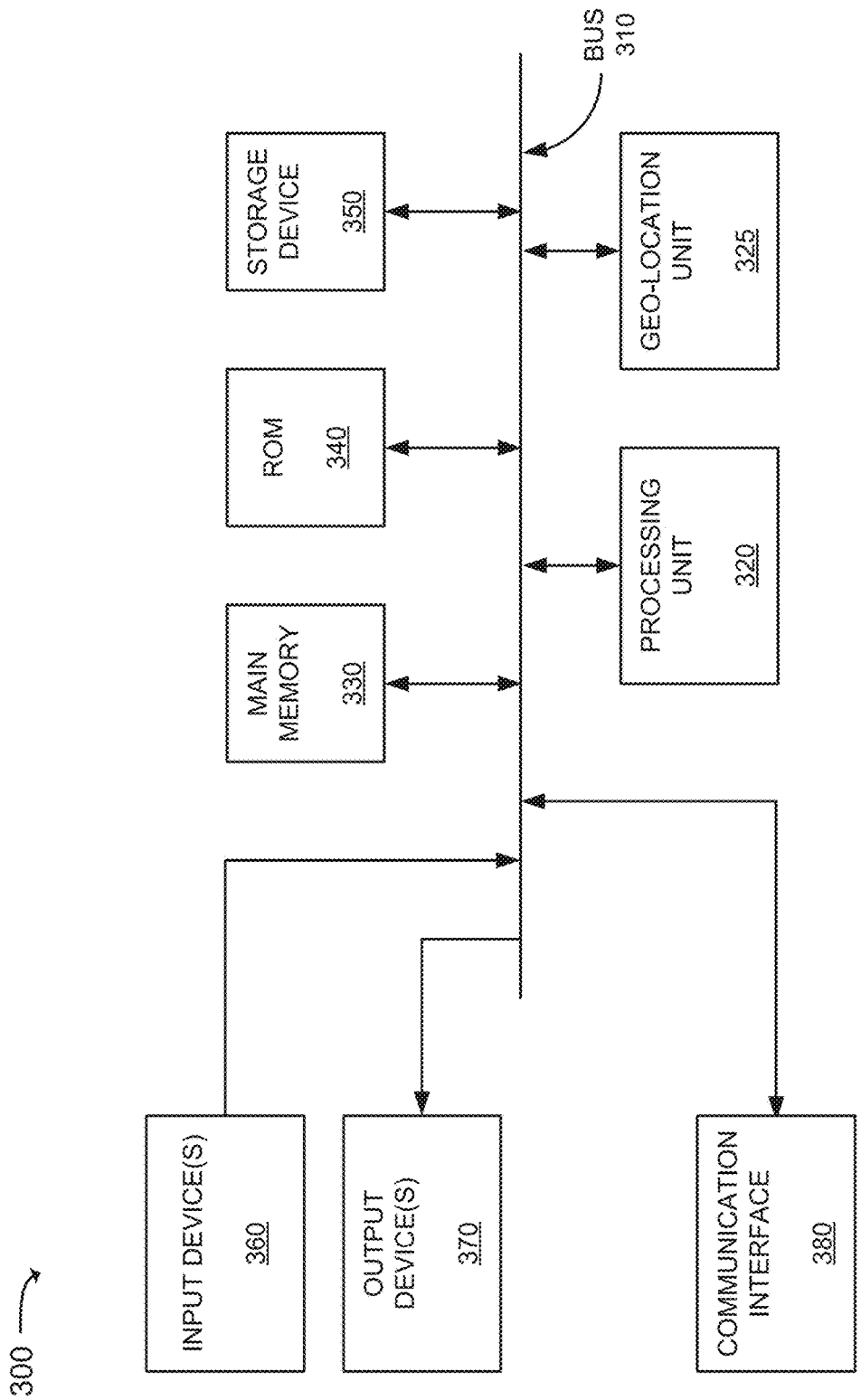
FIG. 3 depicts exemplary components of a device that may correspond to the user devices, thingspace platform, IoT devices, and IoT device database of FIG. 2A.

FIG. 3 depicts exemplary components of a device 300. User devices 220, thingspace platform 210, IoT devices 100, and IoT device DB 230 may each include at least one device configured similarly to device 300, possibly with some variations in components and/or configuration. Device 300 may include a bus 310, a processing unit 320, a geo-location unit 325, a main memory 330, a read only memory (ROM)

340, a storage device 350, an input device(s) 360, an output device(s) 370, and a communication interface(s) 380.

Bus 310 may include a path that permits communication among the components of device 300. Processing unit 320 may include one or more processors or microprocessors, or processing logic, which may interpret and execute instructions. Geo-location unit 325 may include a device for determining a geo-location of device 300. In one implementation, geo-location unit 325 may include a GPS device that determines a precise geo-location of device 300 based on signals from a GPS satellite system. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium" or a "non-transitory storage medium."

Input device 360 may include one or more mechanisms that permit an operator to input information to device 300, such as, for example, a keypad or a keyboard, a display with a touch sensitive panel, voice recognition and/or biometric mechanisms, etc. Output device 370 may include one or more mechanisms that output information to the device's operator or user, including a display, a speaker, etc. Input device 360 and output device 370 may, in some implementations, be implemented as a graphical user interface (GUI) that displays GUI information and which receives user input via the GUI. In an instance where device 300 is a user device 220, the GUI of input device 360 and output device 370 may include a touch screen GUI that uses any type of touch screen device. Communication interface(s) 380 may include a transceiver that enables device 300 to communicate with other devices and/or systems. For example, communication interface(s) 380 may include wired and/or wireless transceivers for communicating via network(s) 240. In an instance where device 300 is an IoT device 100, communication interface(s) 380 may include a wireless transceiver for communicating via a WLAN 130-1 and/or a cellular network 130-2.

The configuration of components of device 300 shown in FIG. 3 is for illustrative purposes. Other configurations may be implemented. Therefore, device 300 may include additional, fewer and/or different components, arranged in a different configuration, then depicted in FIG. 3. For example, an IoT device 100 may include similar components to those shown in FIG. 3, but may omit input device(s) 360, output device(s) 370, and storage device 350. As another example, thingspace platform 210 may also include similar components to those shown in FIG. 3, but may omit geo-location unit 325.

Figure 4:
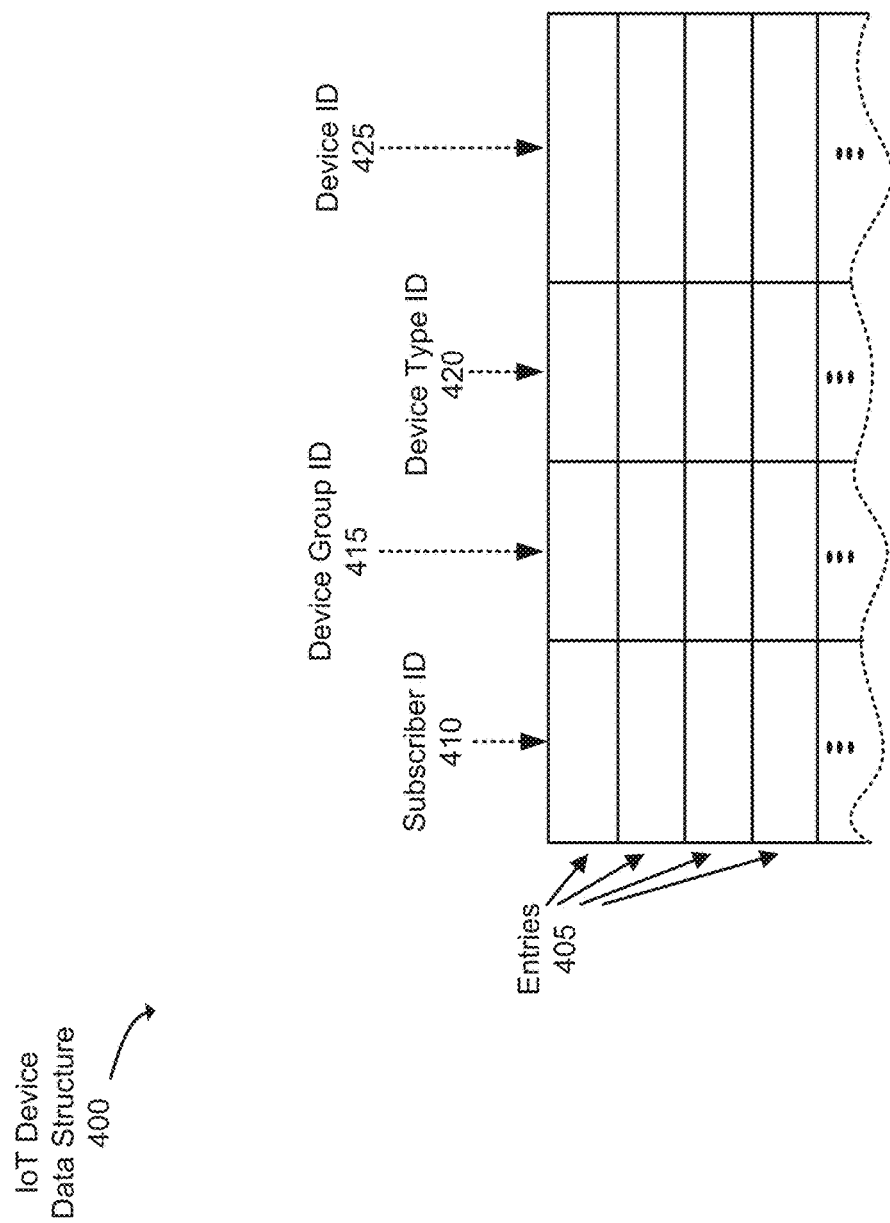
FIG. 4 depicts an exemplary device data structure that may be stored in the IoT device database of FIG. 2A.

FIG. 4 depicts an exemplary device data structure 400 that may be stored in IoT device DB 230. As shown, device data structure 400 may include multiple records/entries 405 and each record/entry 405 may include a subscriber ID field 410, a device group ID field 415, a device type ID field 420, and a device ID field 425.

Subscriber ID field 410 stores a unique identifier associated with a particular user/subscriber 150 (i.e., that may be an owner, operator, and/or administrator of an IoT device 100, or a group of IoT devices 100). The unique subscriber identifier may, for example, include the mobile telephone number, email address, Medium Access Control (MAC) address, International Mobile Subscriber Identity (IMSI), or International Mobile Equipment Identity (IMEI) associated with the particular user, or associated with a particular device of the user. Other types of unique subscriber identifiers may be used.

Device group ID field 415 stores a unique identifier associated with a group of IoT devices 100 that may be owned, operated, and/or administered by a same user/subscriber. The device group ID serves to collectively identify the IoT devices 100 contained within a same group.

Device type ID field 420 stores an identifier that indicates a type of IoT device of the IoT device(s) identified in field 415 or field 425. The type of IoT device may indicate a function the IoT device 100 performs, a type of sensor data that the IoT device 100 generates, etc.

Device ID(s) field 425 stores a unique identifier associated with a particular IoT device 100 within the group of IoT devices 100 identified by field 415. The unique device ID enables that particular IoT device 100 to be distinguished from every other IoT device 100.

Device data structure 400 may be queried with, for example, a subscriber ID to locate a record/entry 405 having a matching subscriber ID stored in field 410. When such a record/entry 405 is located, data may be stored in one or more of fields 410, 415, 420, and/or 425 of the record/entry 405, or data may be retrieved from one or more of fields 410, 415, 420, and/or 425 of the entry 405. Other fields of a record/entry 405, instead of subscriber ID field 410, may be used for querying device data structure 400, such as, for example, device group ID field 415, or device ID field 425.

Figure 5:
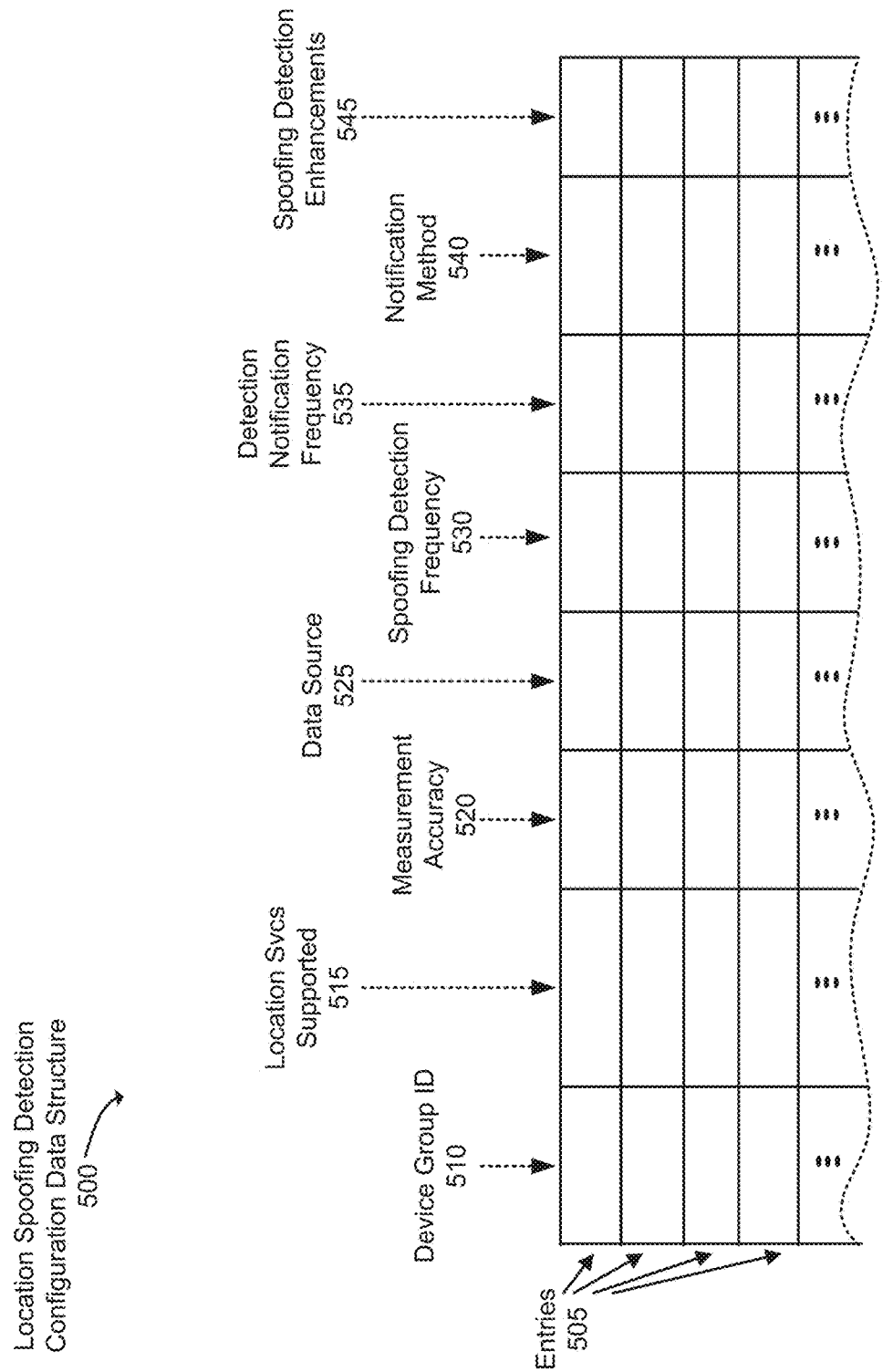
FIG. 5 depicts an exemplary configuration data structure that may be stored in the IoT device database of FIG. 2A.

FIG. 5 depicts an exemplary configuration data structure 500 that may be stored in IoT device DB 230. As shown, the configuration data structure 500 may include multiple records/entries 505 and each record/entry 505 may include a device group ID field 510, a location services (SVCs) supported field 515, a measurement accuracy field 520, a data source field 525, a spoofing detection frequency field 530, a detection notification frequency field 535, a notification method field 540, and a spoofing detection enhancements field 545.

Device group ID field 510 stores a unique identifier associated with a group of IoT devices 100 (e.g., that may be owned, operated, and/or administered by a same user/subscriber). Location SVCs supported field 515 stores data that indicates the particular location services supported by each device 100 of the group of devices identified in field 510, or supported by the wireless network to which each device 100 of the group of devices identified in field 510 connects. For example, field 515 may store data that indicates that the devices of the group identified in field 510 each supports GPS geo-location determination, are connected to a WLAN that supports geo-location determination for each IoT device, and/or are connected to a cellular network that supports geo-location determination for each IoT device.

Measurement accuracy field 520 stores data that indicates measurement accuracies of the location determination services identified in field 515. Data source field 525 stores data identifying a network address(es) of the device(s)/node(s) that supplies/supply the location data to thing space platform 210. Spoof detection frequency field 530 stores data that indicates a frequency at which the spoofing detection function 120 of thingspace platform 210 performs spoofing detection for each of the IoT devices 100 of the group identified in field 510. Detection notification frequency field 535 stores data that indicates a frequency that the user/subscriber associated with the group of IoT devices 100 identified in field 510 is notified while spoofing is detected for an IoT device 100. Notification method field 540 stores data that indicates a selected method of notifying the user/subscriber associated with the group of IoT devices 100, identified by field 510, of an occurrence of a spoofing detection for a IoT device 100. The method of notifying the user/subscriber may include, for example, a text message, an email, a streaming notification, a target client notification delivery, or a polling notification delivery. Spoofing detection enhancements field 545 stores data that indicates optional spoofing detection enhancements, that may be selected by the user/subscriber of the IoT devices in the group identified by field 510, for increasing the accuracy of the location spoofing detection for the IoT device(s).

Configuration data structure 500 may be queried with, for example, a device Group ID to locate a record/entry 505 having a matching device group ID stored in field 510. When such a record/entry 505 is located, data may be stored in one or more fields 510, 515, 520, 525, 530, 540, and/or 545 of the record/entry 505, or data may be retrieved from one or more fields 510, 515, 520, 525, 530, 540, and/or 545 of the record/entry 505. Other fields of a record/entry 505, instead of device group ID field 510, may be used for querying data structure 500, such as, for example, notification method field 540 or location services supported field 515.

Device data structure 400 and configuration data structure 500 are depicted in FIGS. 4 and 5 as including tabular data structures with certain numbers of fields having certain content. The tabular data structures of data structures 400 and 500 shown in FIGS. 4 and 5, however, are for illustrative purposes. Other types of data structures may alternatively be used. The number, types, and content of the entries and/or fields in the data structures 400 and 500 illustrated in FIGS. 4 and 5 are also for illustrative purposes. Other data structures having different numbers of, types of and/or content of, the entries and/or the fields may be implemented. Therefore, data structures 400 and 500 may include additional, fewer and/or different entries and/or fields than those depicted in FIGS. 4 and 5.

Figure 6:
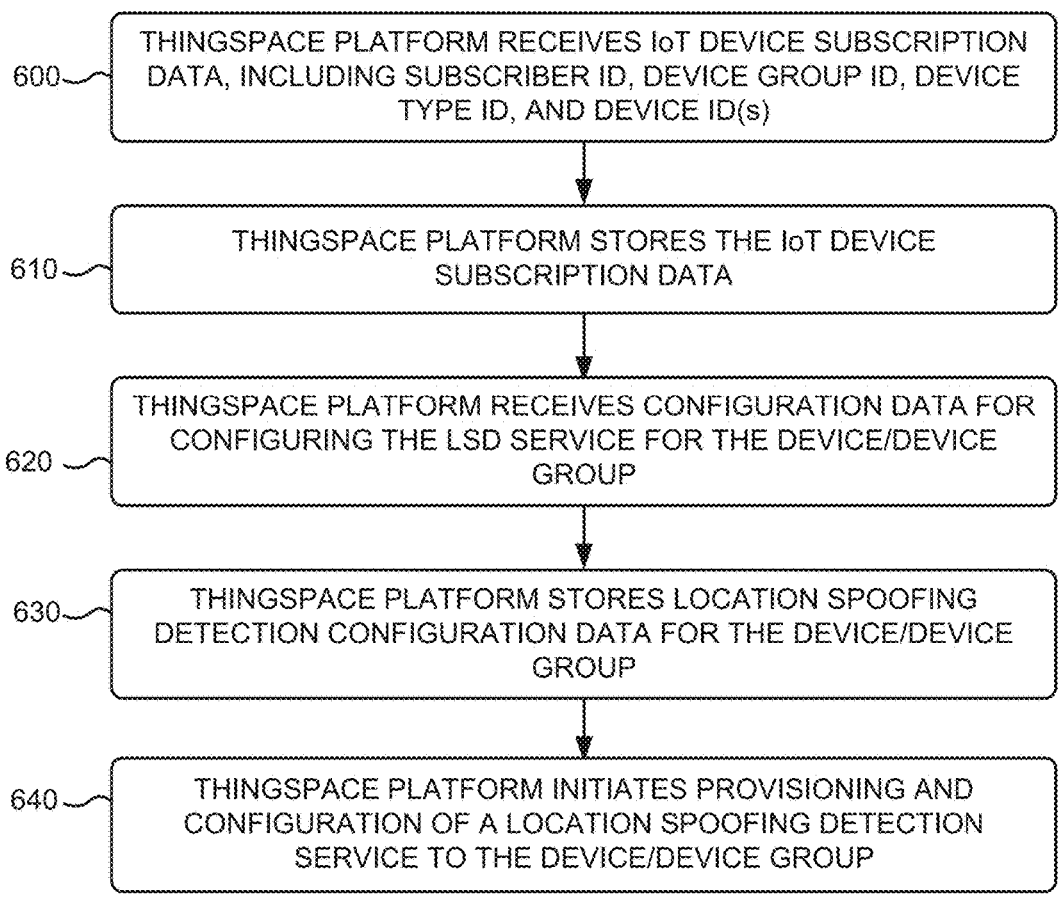
FIG. 6 is a flow diagram that illustrates an exemplary process for subscribing one or more IoT devices to an IoT network service, and providing configuration data for configuring location spoofing detection as applied to the subscribed one or more IoT devices.

FIG. 6 is a flow diagram that illustrates an exemplary process for subscribing one or more IoT devices 100 to an IoT network service, and providing configuration data for configuring location spoofing detection (or other IoT network services) as applied to the subscribed one or more IoT devices 100. The process of FIG. 6 may be implemented by thingspace platform 210, in conjunction with IoT device DB 230. The exemplary process of FIG. 6 may be repeated for each IoT device 100, or each group of IoT devices 100, to be subscribed to the IoT network service (e.g., a CATt-M1 network service) by a user/subscriber associated with the IoT device(s) 100. The process of FIG. 6 is described with respect to the exemplary user interfaces depicted in FIGS. 7 and 8, and the exemplary messaging depicted in FIG. 9.

Figure 7:
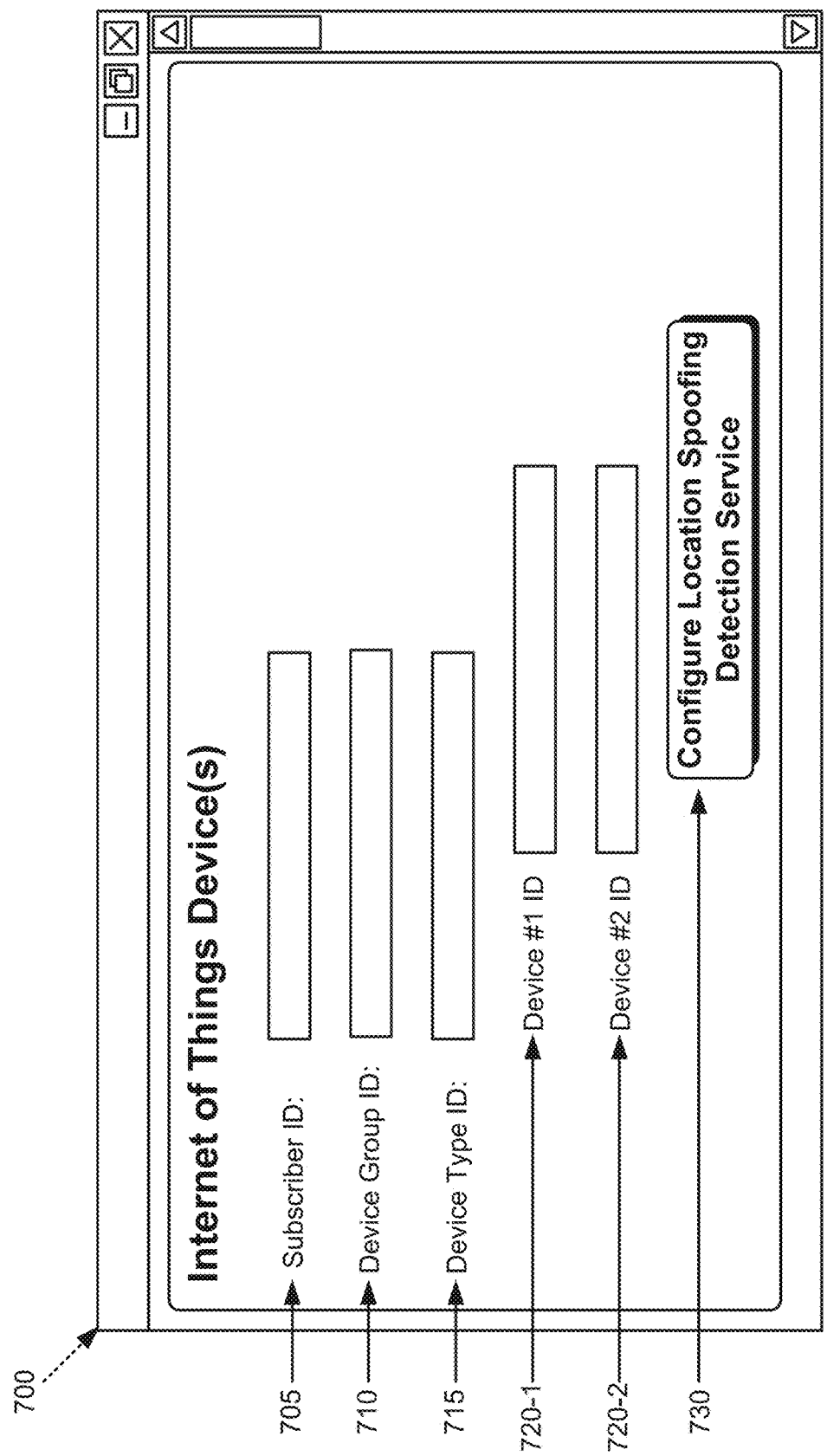
FIGS. 7 and 8 depict exemplary user interfaces implemented on a user device for entering the subscription data and service configuration data of the exemplary process of FIG. 6.
Figure 9:
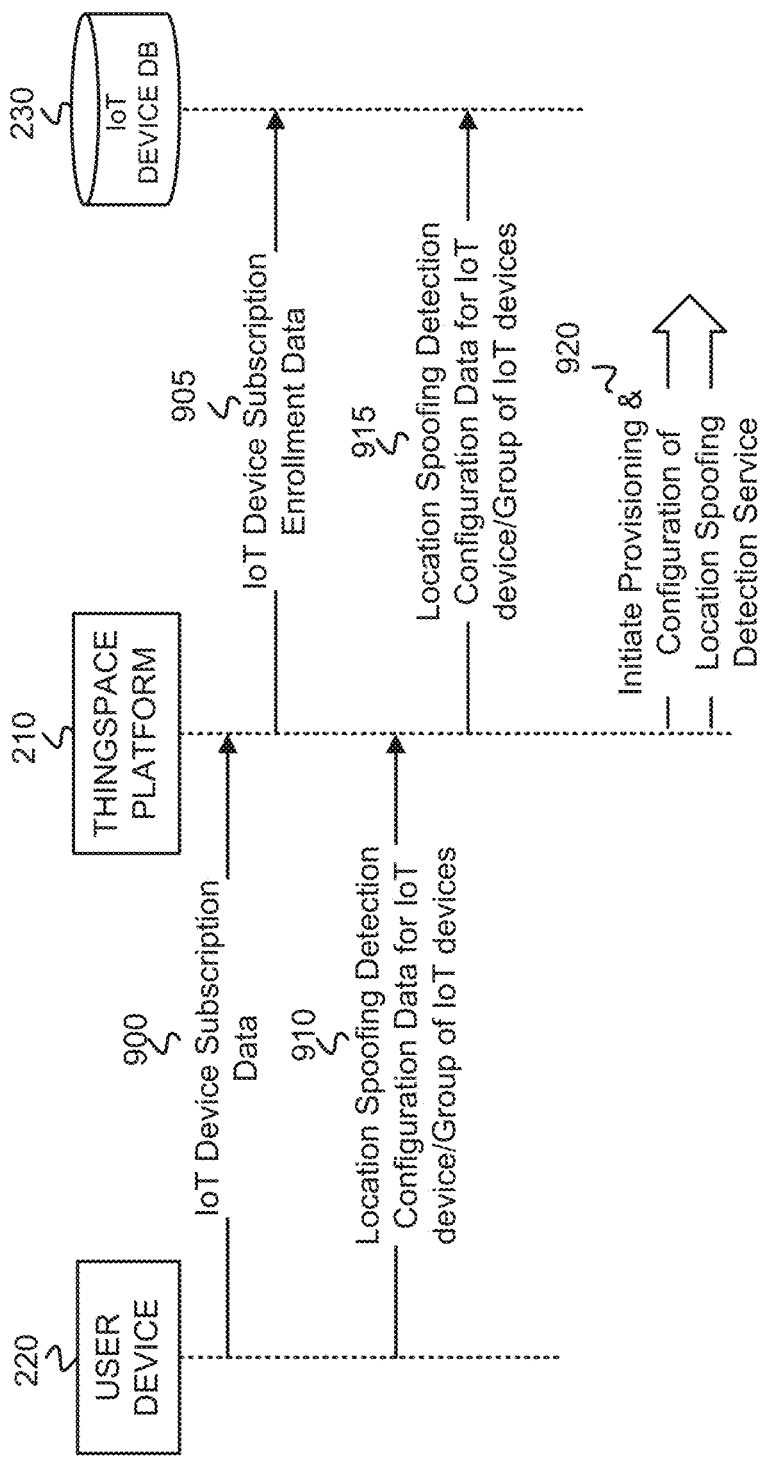
FIG. 9 is an exemplary messaging diagram associated with the process of FIG. 6.

The process of FIG. 6 includes thingspace platform 210 receiving IoT device subscription data for an IoT device, or a group of IoT devices, including a subscriber ID, a device group ID, a device type ID, and a device ID(s) (block 600). FIG. 7 depicts a first exemplary user interface 700, implemented by a user device 220, for a user 150 to supply the IoT device subscription data to thingspace platform 210. As shown, user interface 700 includes a subscriber ID entry block 705, a device group ID entry block 710, a device type ID entry block 715, and multiple device ID entry blocks 720 (two are shown). The user 150 uses an input device 360 (e.g., a touch screen display) of user device 200 to enter a unique subscriber ID assigned to the user 150 in subscriber ID entry block 705; a unique device group ID assigned to the one or more IoT devices 100 in the device group ID entry block 710, a device type ID associated with the one or more IoT devices 100 in the device type ID entry block 715, and unique IDs for each IoT in the group of IoT devices in respective device ID entry blocks 720. Upon completion of entry of the IoT device subscription data, the user 150 may select the user interface button 730 (e.g., touch a touch screen display over a displayed button) to submit the subscription enrollment data and to begin configuring the location spoofing detection service, as described with reference to blocks 620-640 below. Alternatively, instead of user entry via user interface 700, the IoT device subscription data for the IoT device, or group of IoT devices, may be listed in a file (e.g., in a .csv file format) that may be uploaded to thingspace platform 210. FIG. 9 depicts user device 220 supplying IoT device subscription data 900 to thingspace platform.

Thingspace platform 210 stores the IoT device subscription enrollment data in IoT device DB 230 (block 610). For each IoT device in the group of IoT devices being enrolled in the IoT network service subscription, thingspace platform 210 stores the subscriber ID in field 410, the device group ID in field 415, the device type ID in field 420, and the device ID in field 425 of a record/entry 405 of device data structure 400 stored in IoT device DB 230. Therefore, each IoT device 100 enrolled in the IoT network service subscription may have its own record/entry 405 in device data structure 400. FIG. 9 depicts user device 220 thingspace platform 210 storing 905 the IoT device subscription data in IoT device DB 230.

Figure 8:
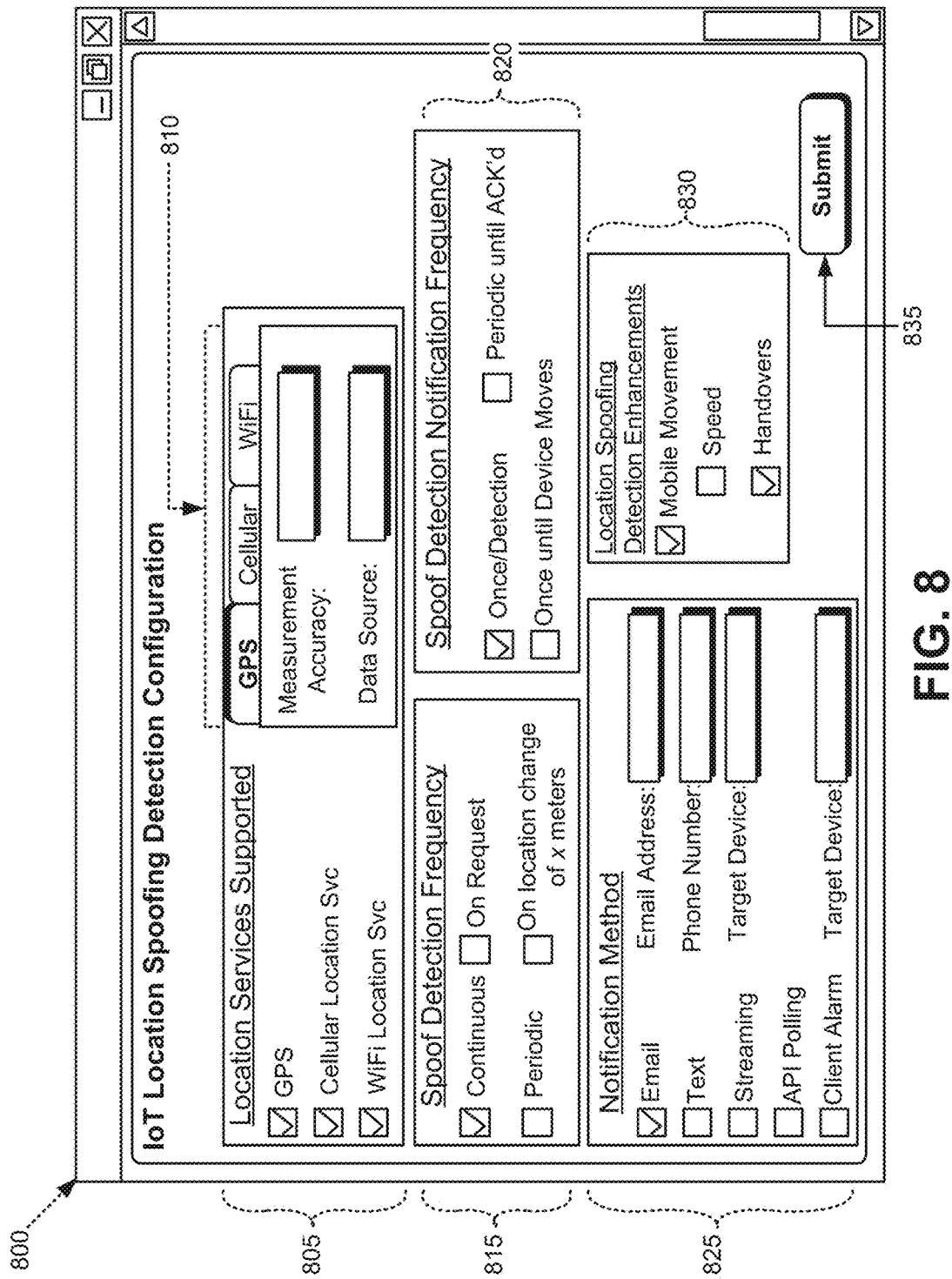

Thingspace platform 210 receives configuration data for configuring the location spoofing detection service for the device/device group (block 620). FIG. 8 depicts a second exemplary user interface 800, implemented by, for example, a user device 220, for a user 105 to supply configuration data to thingspace platform 210. As shown, user interface 800 includes a location services supported entry region 805, a spoof detection frequency region 815, a spoof detection notification frequency region 820, a notification method region 825, and a location spoofing detection enhancements region 830.

Location services supported entry region 805 identifies the location determining services that are provided by the IoT device 100 itself, and/or by the networks (e.g., WLAN 130-1 and/or cellular network 125-2) to which the IoT device 100 is connected. As shown, entry region 805 may include a GPS checkbox, a cellular location services checkbox, or a Wi-Fi location services checkbox. The user 150 (i.e., owner, operator, and/or administrator) associated with a group of IoT devices may select (e.g., by touching each checkbox upon a touch screen display of a user device 220) the two or more location determining services that are available to the IoT devices within the group of IoT devices. In other implementations, thingspace platform 210 may determine the available location determining services and automatically check the appropriate checkboxes in entry region 805 of user interface 800. As further shown in FIG. 8, entry region 805 may include a measurement accuracy region 810, that may be selectable for each location service having a checked checkbox in region 805, for viewing and/or entering a measurement accuracy of the location determining service and a data source for the location determining service.

For example, in the example shown in FIG. 8, a group of same IoT devices 100 may all support GPS location determination, may all connect to a cellular network that supports a cellular device location service, and may also all be able to connect to a WiFi network that supports a WiFi device location service. The user 150 may select a "GPS" tab in measurement accuracy region 810 to view or enter the measurement accuracy for the GPS geo-location measurements of the locations of each IoT device 100, and to view or enter the data source for the GPS measurements. For example, the GPS measurement accuracy may be 5 meters, and the data source may be the geo-location unit 325 of the IoT device 100.

The user 150 may further select a "cellular" tab in measurement accuracy region 810 to view or enter the measurement accuracy for the cellular network triangulation geo-location measurements of the locations of each IoT device 100, and to view or enter the data source for the cellular location measurements. For example, the cellular triangulation geo-location measurements may be 100-150 meters, and the data source may be the network address of wireless location determining function 125-2.

The user 105 may also select a "WiFi" tab in measurement accuracy region 810 to view or enter the measurement accuracy for the wireless LAN location determining measurements of the locations of each IoT device 100, and to view or enter the data source for the cellular location measurements. For example, the WiFi location for each IoT device 100 may be determined to be the geo-location of the current WiFi hotspot to which the IoT device 100 is connected (e.g., a measurement accuracy of possibly tens or hundreds of meters), and the data source may the network address of the wireless location determining function 125-1 in the LAN wireless network 130.

Spoof detection frequency region 815 presents the different detection frequencies that the user 150 may select for the group of IoT devices 100 being configured. Therefore, entry region 815 enables the user 150 to define how frequently the IoT device location data from at least two different location sources are compared to one another to detect location spoofing. In the example region 815 shown in FIG. 8, a continuous, periodic, on-request, or location change frequencies may be selected by the user 150. The continuous frequency indicates that the current primary IoT device location is compared against the secondary IoT device location whenever a new primary or secondary location measurement is obtained. The periodic frequency indicates that the current primary IoT device location, and the secondary IoT device location, are compared at periodic intervals. The on-request frequency indicates that the current primary and secondary location measurements are compared only upon request (e.g., by the user 150). The "on location change of x meters" frequency indicates that the current primary and secondary location measurements are compared when the IoT device 100 has incurred a location change of a specified number of meters x. The number of meters x may be selected by the user, or may be a default value.

Spoof detection notification frequency region 820 presents different notification frequencies that the user 150 may select for the group of IoT devices 100 being configured. Therefore, entry region 820 enables the user 150 to define how many alarm notifications are generated per each location spoofing detection. In the example region 820 shown in FIG. 8, a "once per detection," a "periodic until acknowledged," and a "once until device moves" notification frequencies may be selected. The "once per detection" option configures the location spoofing detection service to generate one alarm notification per each location spoofing detection. The "periodic until acknowledged" option configures the location spoofing detection service to continue generating an alarm notification on a specific periodic interval, until the user 150 acknowledges the alarm. The "once until device moves" option configures the location spoofing detection service to generate a single alarm notification as long as the IoT device 100 is stationary, but to generate one or more subsequent alarm notifications as the IoT device 100 moves to one or more additional locations.

Notification method region 825 presents different notification methods that the user 150 may select for the group of IoT devices 100 being configured. Therefore, region 825 enables the user 150 to define the method by which the user 150 is notified of a location spoofing detection. As shown in the example region 825 of FIG. 8, the selectable notification methods include email, text, streaming, API polling, or client alarm. For email notification, the user 150 enters the email address to which the location spoofing detection alarm notification email should be sent. For text notification, the user 150 enters the textable phone number to which the location spoofing detection alarm notification text should be sent. For streaming notification, the user 150 enters the target device network address (e.g., Internet Protocol (IP) Address, or phone number) to which the location spoofing detection alarm notification is streamed. For API polling notification, selection of this notification option causes thing space platform 210 to store a notification alarm which the user 150 may poll (e.g., via user device 220) to retrieve the alarm notification. For client alarm notification, the user 150 may provide the network address (e.g., IP address or telephone number) of the device in which is installed a target client that receives the alarm notification.

Location spoofing detection enhancements region 830 presents different IoT device 100 or location spoofing detection dependent enhancements that may be available for the user 150 to select for location spoofing detection of the group of IoT devices 100 being configured. Therefore, region 830 enables the user 150 to select enhancements that may be applied to the location spoofing detection. In the example shown in FIG. 8, the location spoofing detection enhancements may include mobile movement enhancements, where an additional measurement accuracy error is applied to IoT devices 100 that are nonstationary. For example, the user 150 may select a "speed" mobile movement enhancement by which an instantaneous speed of the IoT device is measured, and the value of the measured speed is used in the location spoofing detection. As another example, the user 150 may select a "handovers" mobile movement enhancement that tracks a number of handovers, within the serving cellular network 130-2, that occurs for the IoT device over time, and uses those tracked number of handovers in the location spoofing detection. Upon completion of the location spoofing detection configuration, the user 150 may submit the configuration data by, for example, selecting a "submit" button 835 within user interface 800 (e.g., touching the button upon the touch screen display). When the configuration data is submitted, the user device 220 sends the configuration data to thingspace platform 210 for storage in IoT device DB 230. Alternatively, instead of user entry via user interface 800, the configuration data for the IoT device, or group of IoT devices, may be listed in a file (e.g., in a .csv file format) that may be uploaded to thingspace platform 210. FIG. 9 depicts user device 220 supplying location spoofing detection configuration data for the IoT device/group of IoT devices to thingspace platform 210.

Thingspace platform 210 stores the location spoofing detection configuration data for the device/device group in IoT device DB 230 (block 630). The device group ID for the group of IoT devices 100 being configured are stored in field 510, the location services supported data is stored in field 515, the measurement accuracy data is stored in field 520, the data source data is stored in field 525, the spoofing detection frequency data is stored in field 530, the detection notification frequency data is stored in field 535, the notification method is stored in field 540, and the spoofing detection enhancements data are stored in field 545 of an entry 505 of location spoofing detection configuration data structure 500 in IoT devices DB 230. FIG. 9 depicts thingspace platform 210 storing 915 the location spoofing detection configuration data for the IoT device/group of IoT devices in IoT device DB 230.

Thingspace platform 210 initiates the provisioning and configuration of a location spoofing detection service to the device/device group (block 640). Thingspace platform 210 may, for example, initiate location determination of the IoT devices 100 with wireless location determining function 125-1 in wireless LAN network 130-1, and/or with wireless location determining function 125-2 in cellular network 130-2. Upon initiation of the location determination, wireless location determining function 125-1 may report (e.g., periodically), to thingspace platform 210, the current location of connected IoT devices 100 within WLAN(s) 130-1, and/or wireless location determining function 125-2 may report (e.g., periodically), to thingspace platform 210, the current location of connected IoT devices 100 within cellular network(s) 130-2. FIG. 9 depicts thingspace platform 210 initiating 920 the provisioning and configuration of location spoofing detection service to the enrolled IoT device/group of IoT devices.

Figure 10:
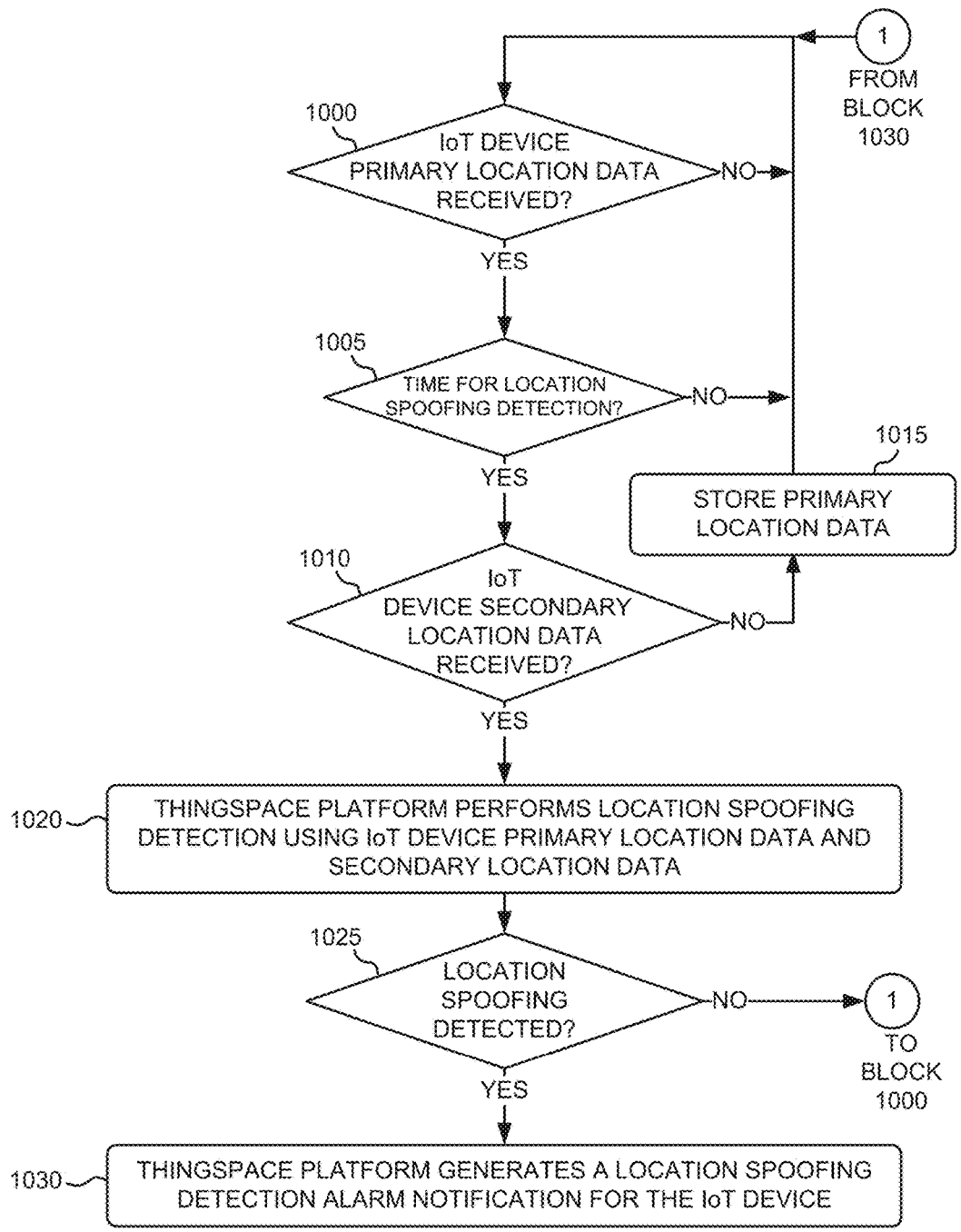
FIG. 10 is a flow diagram that illustrates an exemplary process for performing location spoofing detection for an IoT device based on current primary and secondary locations associated with the IoT device.

FIG. 10 is a flow diagram that illustrates an exemplary process for performing location spoofing detection for an IoT device 100 based on current primary and secondary locations associated with the IoT device 100. The exemplary process of FIG. 10 may be implemented by thingspace platform 210, in conjunction with IoT device DB 230, and one or more wireless location determination functions 125. The exemplary process of FIG. 10 is described with respect to the operations/messaging/signaling diagram of FIG. 11.

Figure 11:
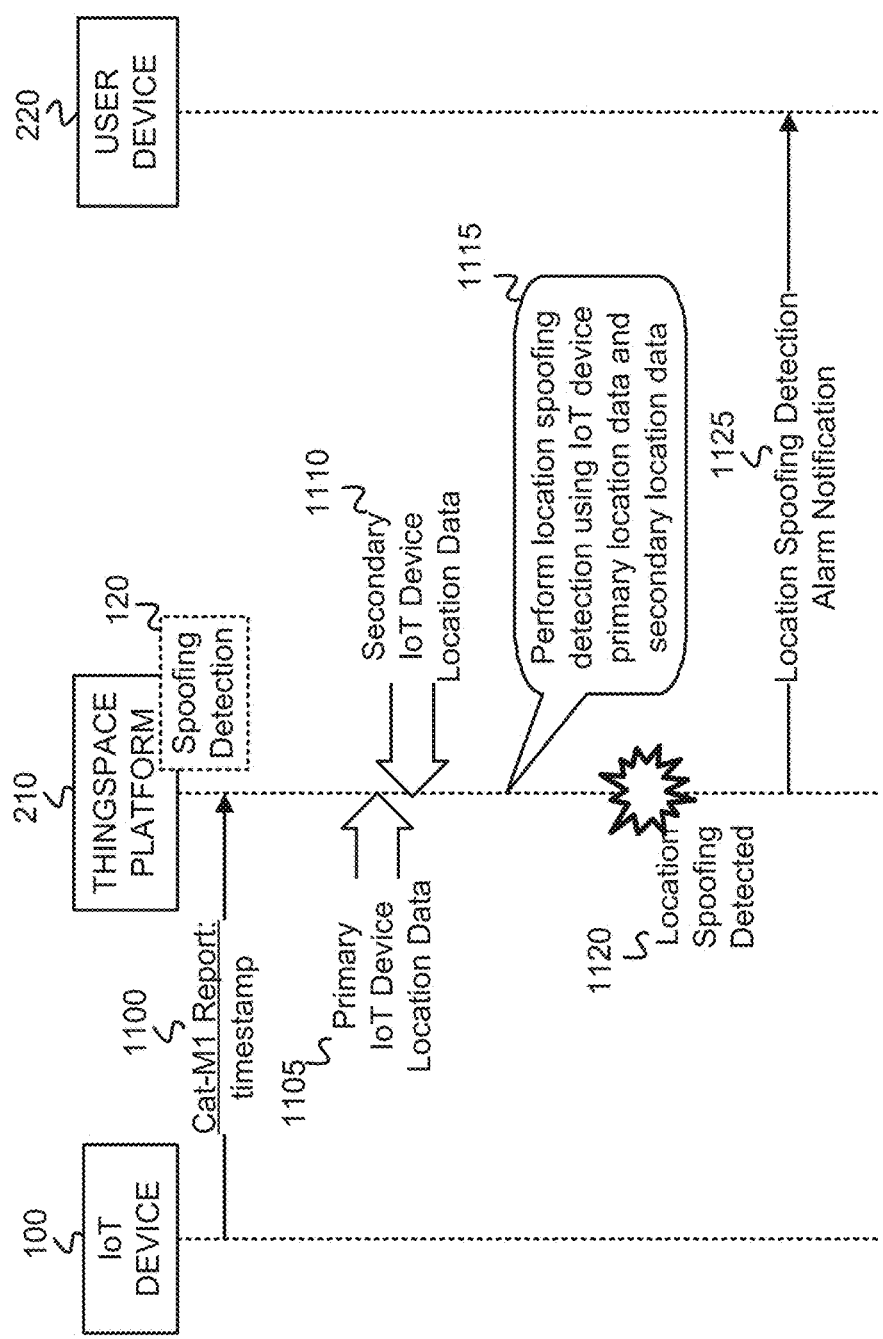
FIG. 11 is an exemplary messaging diagram associated with the process of FIG. 10.

The exemplary process includes thingspace platform 210 determining if primary location data associated with the IoT device 100 has been received (block 1000). The primary location data may include GPS coordinates received from the IoT device 100 itself, wireless network-generated device location data received from wireless location determining function 125-1 in wireless LAN network 130-1, or wireless network-generated device location data received from wireless location determining function 125-2 in cellular network(s) 130-2. The primary location data source may have been selected by the user 150 during location spoofing detection configuration (e.g., block 620 of FIG. 6). FIG. 11 depicts IoT device 100 sending a Cat-M1 report 1100 that includes a timestamp, and thingspace platform 210 receiving primary IoT device location data 1105 from a location source. In one implementation, the primary IoT device location data 1105 may include GPS coordinate data, and may be received from the IoT device 100 within the Cat-M1 report 1100. In another implementation, the primary location data may include wireless network-generated device location data received from wireless location determining function 125-2 in cellular network(s) 130-2. If the IoT device 100's primary location data has not been received (NO—block 1000), then block 1000 repeats until the primary location data is received by thingspace platform 210.

If the primary location data has been received (YES—block 1000), then thingspace platform 210 determines if it is time, for the IoT device 100, to perform location spoofing detection (block 1005). The user 150 may specify a location spoofing detection frequency during location spoofing detection configuration (e.g., block 620 of FIG. 6), and thingspace platform 210 may wait an amount of time prior to performing the location spoofing detection. The wait time may be based on the configuration data supplied by the user 150 associated with the IoT device(s) 100. If it is not time to perform location spoofing detection (NO—block 1005), then the process continues with the repeat of block 1000.

If it is time to perform location spoofing detection (YES—block 1005), then thingspace platform 210 determines if secondary location data associated with the IoT device 100 has been received (block 1010). The secondary location data may include, for example, wireless network-generated device location data received from wireless location determining function 125-1 in WLAN network 130-1, or wireless network-generated device location data received from wireless location determining function 125-2 in cellular network(s) 130-2. For example, if the primary location data includes GPS coordinates received from the IoT device 100 itself, then the secondary location data may include wireless network-generated device location data received from wireless location determining function 125-1 in WLAN 130-1, or wireless network-generated device location data received from wireless location determining function 125-2 in cellular network(s) 130-2. As another example, if the primary location data includes wireless network-generated device location data received from wireless location determining function 125-2 in cellular network(s) 130-2, then the secondary location data may include wireless network-generated device location data received from wireless location determining function 125-1 in WLAN 130-1. The secondary location data source may have been selected by the user 150 during location spoofing detection configuration (e.g., block 620 of FIG. 6). FIG. 11 depicts thingspace platform 210 receiving secondary IoT device location data 1110.

If secondary location data has not been received for the IoT device (NO—block 1010), then thingspace platform 210 stores the primary location data in IoT device DB 230 (block 1015), and the process continues with a repeat of block 1000. If secondary location data has been received for the IoT device 100 (YES—block 1010), thingspace platform 210 performs location spoofing detection using the current primary location data and the secondary location data for the IoT device 100 (block 1020). In one implementation, location spoofing is detected by spoofing detection function 120 of thingspace platform 210 when the sum of the absolute value of the distance between the primary location and the secondary location is greater than the total measurement accuracy (location spoofing detection=absolute value of the distance between primary location and secondary location>total measurement accuracy). The total measurement accuracy, as referred to herein, equals the sum of the measurement accuracy associated with the primary location data and the measurement accuracy associated with the secondary location data.

In another implementation, if the user 150 has selected location spoofing detection enhancements during location spoofing detection configuration (e.g., during block 620 of FIG. 6), then location spoofing may be detected by spoofing detection function 120 of thingspace platform 210 when the sum of the absolute value of the distance between the primary location and the secondary location plus a mobility movement adjustment is greater than the total measurement accuracy (location spoofing detection=(absolute value of distance between primary location and secondary location+ mobility movement adjustment)>total measurement accuracy. The mobility movement adjustment is described further below.

If, during location spoofing detection configuration, the user 150 has selected a "speed" location spoofing detection enhancement, then the mobility movement adjustment may be set equal to the IoT device 100's speed multiplied by the reporting delay (speed*reporting delay), where the reporting delay is the interval between the time at which the IoT device 100's speed was determined, and the time at which spoofing detection function 120 detects location spoofing of the IoT device 100. For example, a stationary IoT device (e.g., a water meter) would have a speed of zero, equaling a mobility adjustment of zero. As another example, if an IoT device 100 that is capable of reporting the instantaneous speed of the device 100, reports a speed of 14 meters/second and the reporting delay is 5 seconds, then the mobility movement adjustment would be 14 m/s*5 s=70 meters.

If, during location spoofing detection configuration, the user 150 has selected a "handovers" location spoofing detection enhancement, then the mobility movement adjustment may be set equal to the number of handovers multiplied by the average cell distance divided by the sampling time multiplied by the reporting delay (# handovers*(average cell distance/sampling time)*reporting delay). For example, if an IoT device 100 that is capable of collecting and reporting a number of handovers between cells reports three handovers over a sampling time of 10 seconds, with an average cell distance of 75 meters and a reporting delay of 5 seconds, then the mobility movement adjustment would be 3*(75 m/10 s)*5 s=112.5 m. Other types of handover adjustment algorithms may alternatively be used, including algorithms that take into account hierarchical cell planning. FIG. 11 depicts thingspace platform 210 performing 1115 location spoofing detection using the received IoT device primary location data and IoT device secondary location data.

If thingspace platform 210 has detected location spoofing in block 1020 (YES—block 1025), then thingspace platform 210 generates a location spoofing detection alarm notification for the IoT device 100 (block 1030). The location spoofing detection alarm notification may be generated, and supplied to the user 150 associated with the IoT device 100 based on the location spoofing detection configuration data of block 620 of FIG. 6. Thus, the location spoofing detection alarm notification may be supplied at a specified frequency (e.g., once per detection, periodic until acknowledged, once until device moves), and via a specified method (e.g., email, text, streaming, polling, client alarm). The location spoofing detection alarm notification may include data that identifies the IoT device 100, and which may include the last known valid location of the IoT device 100 prior to the detection of location spoofing. FIG. 11 depicts spoofing detection function 120 of thingspace platform 210 detecting 1120 location spoofing, and sending a location spoofing detection alarm notification 1125 to user device 220. If thingspace platform 210 has not detected location spoofing (NO—block 1025), then the process continues with a repeat of block 1000. The exemplary process of FIG. 10 may be repeated by thingspace platform 210 continuously, or periodically (e.g., every 0.5 seconds).

Figure 12:
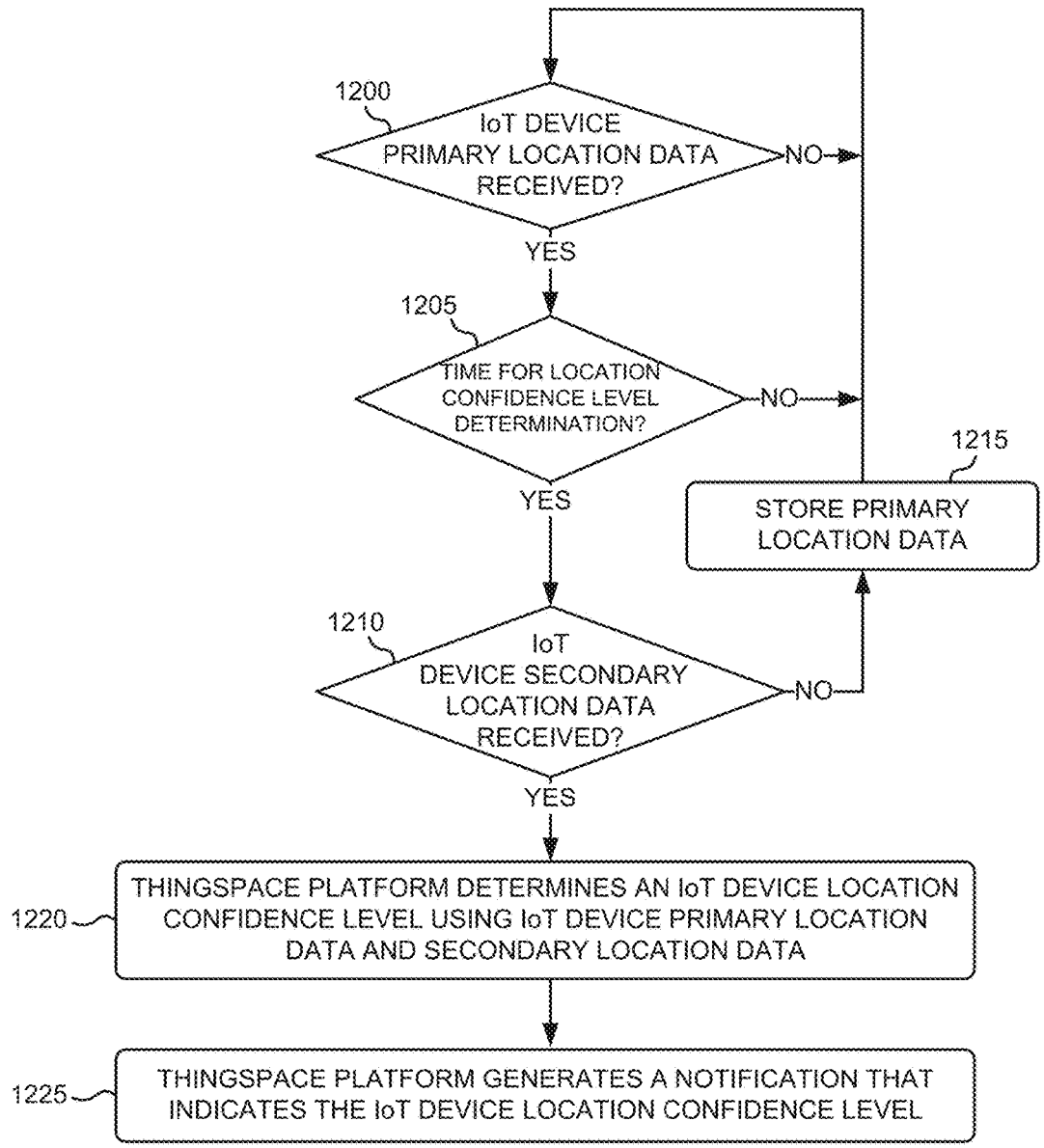
FIG. 12 is a flow diagram that illustrates an exemplary process for determining a confidence level associated with a location of an IoT device based on current primary and secondary locations associated with the IoT device.

FIG. 12 is a flow diagram that illustrates an exemplary process for determining a confidence level associated with a location of an IoT device 100 based on current primary and secondary locations associated with the IoT device 100. The exemplary process of FIG. 12 may be implemented by thingspace platform 210, in conjunction with IoT device DB 230, and one or more wireless location determination functions 125. The exemplary process of FIG. 12 is described with respect to the operations/messaging diagram of FIG. 13.

Figure 13:
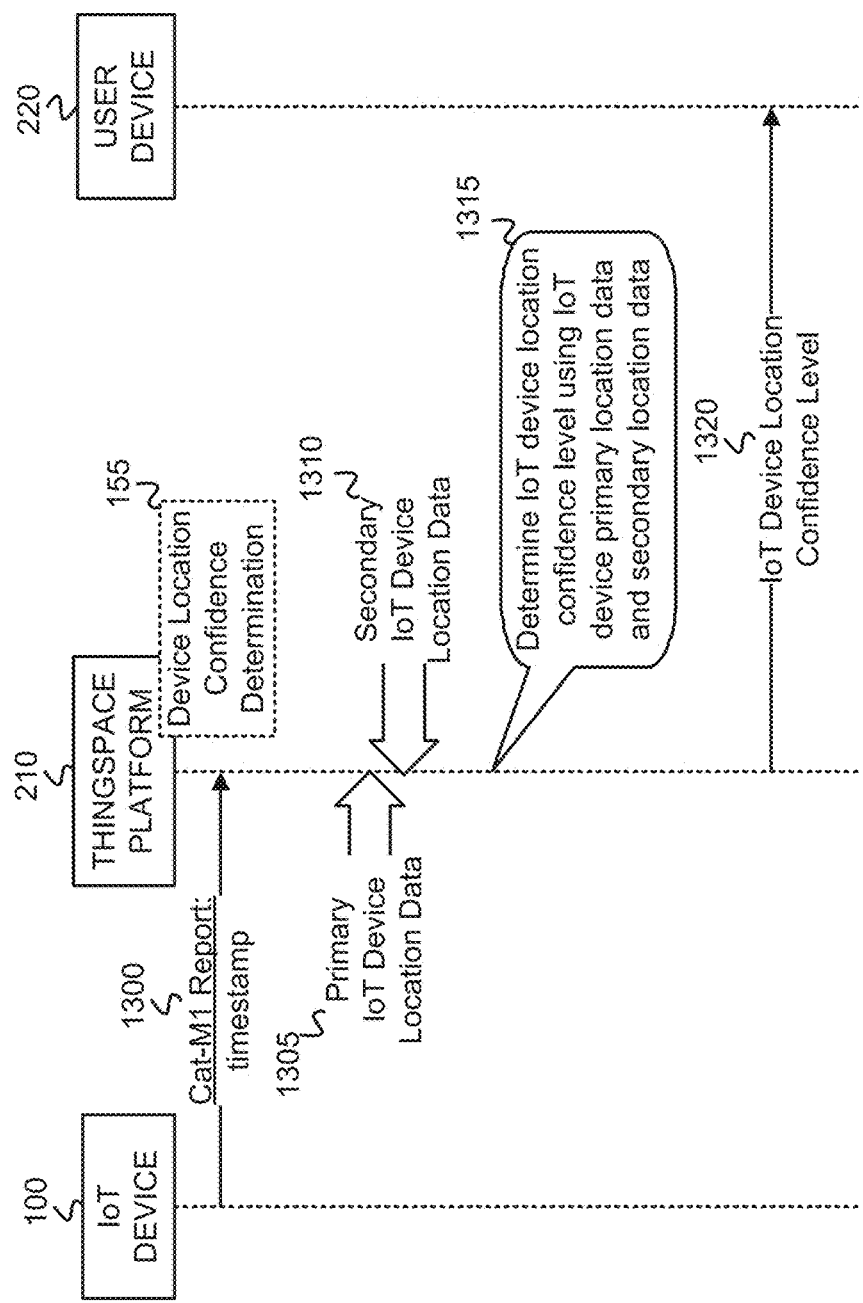
FIG. 13 is an exemplary messaging diagram associated with the process of FIG. 12.

The exemplary process includes thingspace platform 210 determining if primary location data associated with the IoT device 100 has been received (block 1200). The primary location data may include GPS coordinates received from the IoT device 100 itself, wireless network-generated device location data received from wireless location determining function 125-1 in wireless LAN network 130-1, or wireless network-generated device location data received from wireless location determining function 125-2 in cellular network(s) 130-2. The primary location data source may have been selected by the user 150 during location spoofing detection configuration (e.g., block 620 of FIG. 6). FIG. 13 depicts IoT device 100 sending a Cat-M1 report 1300 that includes a timestamp, and thingspace platform 210 receiving primary IoT device location data 1305 from a location source. In one implementation, the primary IoT device location data 1305 may include GPS coordinate data, and may be received from the IoT device 100 within the Cat-M1 report 1300. If the IoT device 100's primary location data has not been received (NO—block 1200), then block 1200 repeats until the primary location data is received by thingspace platform 210.

If the primary location data has been received (YES—block 1200), then thingspace platform 210 determines if it is time, for thingspace platform 210, to determine a location confidence level associated with the geo-location of the IoT device 100 (block 1205). The user 150 may specify a location confidence level determination frequency during the configuration process (e.g., block 620 of FIG. 6), and thingspace platform 210 may wait an amount of time determined by the user-supplied configuration data prior to performing the location confidence level determination. If it is not time to determine a location confidence level associated with the IoT device 100 (NO—block 1205), then the process continues with the repeat of block 1200.

If it is time to determine a location confidence level associated with the IoT device 100 (YES—block 1205), then thingspace platform 210 determines if secondary location data associated with the IoT device 100 has been received (block 1210). The secondary location data may include wireless network-generated device location data received from wireless location determining function 125-1 in WLAN network 130-1, or wireless network-generated device location data received from wireless location determining function 125-2 in cellular network(s) 130-2. For example, if the primary location data includes GPS coordinates received from the IoT device 100 itself, then the secondary location data may include wireless network-generated device location data received from wireless location determining function 125-1 in WLAN network 130-1, or wireless network-generated device location data received from wireless location determining function 125-2 in cellular network(s) 130-2. As another example, if the primary location data includes wireless network-generated device location data received from wireless location determining function 125-2 in cellular network(s) 130-2, then the secondary location data may include wireless network-generated device location data received from wireless location determining function 125-1 in WLAN network 130-1. The secondary location data source may have been selected by the user 150 during location spoofing detection configuration (e.g., block 620 of FIG. 6). FIG. 13 depicts thingspace platform 210 receiving secondary IoT device location data 1310.

If secondary location data has not been received for the IoT device (NO—block 1210), then thingspace platform 210 stores the primary location data in IoT device DB 230 (block 1215), and the process continues with a repeat of block 1200. If secondary location data has been received for the IoT device 100 (YES—block 1210), thingspace platform 210 determines a location confidence level associated with the IoT device 100 using the IoT device's primary location data and the secondary location data (block 1220). The location confidence level is an indicator of the likelihood that the IoT device 100 is actually located at the location indicated by the primary location data. In one implementation, IoT device location confidence levels may be determined by applying specified confidence thresholds to the primary and secondary location data. In an example wherein the IoT device location confidence levels include "no confidence," "low confidence," and "high confidence," the IoT device location confidence levels may be determined based on the following:

No Confidence: The sum of the absolute value of the distance between the primary location and the secondary location is greater than or equal to the total measurement accuracy (No Confidence=absolute distance between primary location and secondary location>toal measurement accuracy).

Low Confidence: The sum of the absolute value of the distance between the primary location and the secondary location is less than the total measurement accuracy, but greater than or equal to the total measurement accuracy minus a first specified confidence threshold $TH_1$ value (Low Confidence=absolute value of the distance between primary location data and secondary location data<total measurement accuracy, but > or = total measurement accuracy−$TH_1$)

High Confidence: The sum of the absolute distance between the primary location and the secondary location is less than the total measurement accuracy minus $TH_1$, but greater than the total measurement accuracy minus a second specified confidence threshold $TH_2$ value (High Confidence=absolute value of the distance between primary location and secondary location<total measurement accuracy−$TH_1$, but > or = total measurement accuracy−$TH_2$, where $TH_2$>$TH_1$).

The "no confidence" confidence level indicates that it is very likely that the IoT device is not at the location indicated by the primary location data. The "low confidence" confidence level indicates that it is not likely that the IoT device 100 is at the location indicated by the primary location data. The "high confidence" confidence level indicates that it is very likely that the IoT device 100 is at the location indicated by the primary location data.

In another implementation, if the user 150 has selected location spoofing detection enhancements during configuration (e.g., during block 620 of FIG. 6), then the IoT device location confidence levels may be alternatively determined based on the following:

No Confidence: The sum of the absolute value of the distance between the primary location and the secondary location plus the mobility movement adjustment is greater than or equal to the total measurement accuracy (No Confidence=absolute value of the distance between primary location and secondary location+mobility movement adjustment>total measurement accuracy). Examples of mobility movement adjustments are described further below.

Low Confidence: The sum of the absolute value of the distance between the primary location and the secondary location plus the mobility movement adjustment is less than the total measurement accuracy, but greater than or equal to the total measurement accuracy minus a first specified confidence threshold $TH_1$ value (Low Confidence=absolute value of the distance between primary location and secondary location+mobility movement adjustment<total measurement accuracy, but > or = total measurement accuracy−$TH_1$)

High Confidence: The sum of the absolute value of the distance between the primary location and the secondary location plus the mobility movement adjustment is less than the total measurement accuracy minus $TH_1$, but greater than the total measurement accuracy minus a second specified confidence threshold $TH_2$ value (High Confidence=absolute value of the distance between primary location and secondary location<total measurement accuracy−$TH_1$, but > or = total measurement accuracy−$TH_2$, where $TH_2$>$TH_1$).

If, during location spoofing detection configuration, the user 150 has selected a "speed" location spoofing detection enhancement, then the mobility movement adjustment may be set equal to the IoT device 100's speed multiplied by the reporting delay (speed*reporting delay), where the reporting delay is the interval between the time at which the IoT device 100's speed was determined, and the time at which spoofing detection function 120 detects location spoofing of the IoT device 100. For example, a stationary IoT device (e.g., a water meter) would have a speed of zero, resulting in a mobility movement adjustment of zero. As another example, if an IoT device 100 that is capable of measuring the instantaneous speed of the device 100, reports a speed of 14 meters/second and the reporting delay is 5 seconds, then the mobility movement adjustment would be 14 m/s*5 s=70 meters.

If, during location spoofing detection configuration, the user 150 has selected a "handovers" location spoofing detection enhancement, then the mobility movement adjustment may be set equal to the number of handovers multiplied by the average cell distance divided by the sampling time multiplied by the reporting delay (# handovers*(average cell distance/sampling time)*reporting delay). As an illustrative example, if an IoT device 100 that is capable of collecting and detecting a number of handovers between cells, reports three handovers over a sampling time of 10 seconds, with an average cell distance of 75 meters and a reporting delay of 5 seconds, then the mobility movement adjustment would be 3*(75 m/10 s)*5 s=112.5 m. Other types of handover adjustment algorithms may alternatively be used, including algorithms that take into account hierarchical cell planning. FIG. 13 depicts device location confidence determination function 155 of thingspace platform 210 determining 1315 the location confidence level associated with an IoT device 100 using primary and secondary location data received for that IoT device 100.

Thingspace platform 210 generates a notification for the IoT device 100 that indicates the IoT device location confidence level determined in block 1220 (block 1225). The notification may be generated, and supplied to the user 150 associated with the IoT device 100 based on the configuration data of block 620 of FIG. 6. Thus, the notification may be supplied at a frequency, and via a method (e.g., email, text, streaming, polling, client alarm) specified by the user 150 in the configuration data. The location spoofing detection alarm notification may include data that identifies the IoT device 100, the IoT device location confidence level, and the last known location of the IoT device 100 at which the IoT device location confidence level was a high confidence level. FIG. 13 depicts device location confidence determination function 155 of thingspace platform 210 providing the determined IoT device location confidence level 1320 to a user device 220 associated with the user 150 of the IoT device 100. The exemplary process of FIG. 12 may be repeated by thingspace platform 210 continuously, or periodically (e.g., every 0.5 seconds).

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6, 10, and 12, and operations/signaling/message flows with respect to FIGS. 9, 11, and 13, the order of the blocks and/or operations/signaling/message flows may be varied in other implementations. Moreover, non-dependent blocks may be performed in parallel.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A network device, comprising:
   a communication interface connected to a network and configured to:
   receive subscription data for one or more Internet of Things (IoT) devices for subscribing to an IoT device cellular network service,
   receive configuration data for configuring the IoT device cellular network service for the one or more IoT devices, wherein the configuration data identifies a first device location determining source and a second device location determining source,
   receive primary location data, generated by the first device location determining source, associated with a first IoT device of the one or more IoT devices, and
   receive secondary location data, generated by the second device location determining source, associated with the first IoT device; and
   a processing unit configured to:
   initiate provisioning of the IoT cellular network service for the one or more IoT devices, and
   determine one of a plurality of confidence levels associated with the first IoT device being located at a primary location based on one or more confidence thresholds, the primary location data, and the secondary location data.

2. The network device of claim 1, wherein, when determining one of the plurality of confidence levels associated with the first IoT device being located at the primary location, the processing unit is further configured to:
   determine one of a no confidence, low confidence, or high confidence level that indicates a degree of likelihood that the first IoT device is located at the primary location.

3. The network device of claim 2, wherein the no confidence level indicates that it is very likely that the first IoT device is not located at the primary location, wherein the low confidence level indicates that it is not likely that the first IoT device is located at the primary location, and wherein the high confidence level indicates that it is very likely that the first IoT device is located at the primary location.

4. The network device of claim 1, wherein the IoT device cellular network service comprises a low power wide area cellular network service, and wherein the low power wide area cellular network service comprises a Long Term Evolution (LTE) Cat-M1 cellular network service.

5. The network device of claim 1, wherein the first device location determining source comprises a Global Positioning System (GPS) device, and the second device location determining source comprises a cellular network location determining function or a wireless Local Area Network (LAN) location determining function.

6. The network device of claim 1, wherein the first device location determining source comprises a cellular network location determining function, and wherein the second device location determining source comprises a wireless Local Area Network (LAN) location determining function.

7. The network device of claim 1, wherein the configuration data includes a notification method and wherein the processing unit is further configured to:
   generate a notification, that indicates the determined one of the plurality of confidence levels, in accordance with the notification method.

8. A method, comprising:
   receiving, by a network device, subscription data for one or more Internet of Things (IoT) devices for subscribing to an IoT device cellular network service;
   receiving, by the network device, configuration data for configuring the IoT device cellular network service for the one or more IoT devices, wherein the configuration data identifies a first device location determining source and a second device location determining source;
   initiating, by the network device, provisioning of the IoT device cellular network service for the one or more IoT devices;
   receiving, by the network device, primary location data, generated by the first device location determining source, associated with a first IoT device of the one or more IoT devices;
   receiving, by the network device, secondary location data, generated by the second device location determining source, associated with the first IoT device; and determining, by the network device, one of a plurality of confidence levels associated with the first IoT device being located at a primary location based on one or more confidence thresholds, the primary location data, and the secondary location data.

9. The method of claim 8, wherein determining one of the plurality of confidence levels associated with the first IoT device being located at the primary location comprises:

determining one of a no confidence, low confidence, or high confidence level that indicates a degree of likelihood that the first IoT device is located at the primary location.

10. The method of claim 9, wherein the no confidence level indicates that it is very likely that the first IoT device is not located at the primary location, wherein the low confidence level indicates that it is not likely that the first IoT device is located at the primary location, and wherein the high confidence level indicates that it is very likely that the first IoT device is located at the primary location.

11. The method of claim 8, wherein the IoT device cellular network service comprises a low power wide area cellular network service, and wherein the low power wide area cellular network service comprises a Long Term Evolution (LTE) Cat-M1 cellular network service.

12. The method of claim 8, wherein the first device location determining source comprises a Global Positioning System (GPS) device, and the second device location determining source comprises a cellular network location determining function or a wireless Local Area Network (LAN) location determining function.

13. The method of claim 8, wherein the first device location determining source comprises a cellular network location determining function, and wherein the second device location determining source comprises a wireless Local Area Network (LAN) location determining function.

14. The method of claim 8, wherein the configuration data includes a notification method and wherein the method further comprises:

generating a notification, that includes the determined one of the plurality of confidence levels, in accordance with the notification method.

15. A non-transitory storage medium storing instructions executable by a network device, wherein the instructions comprise instructions to cause the network device to:

receive subscription data for one or more Internet of Things (IoT) devices for subscribing to an IoT device cellular network service;

receive configuration data for configuring the IoT device cellular network service for the one or more IoT devices, wherein the configuration data identifies a first device location determining source and a second device location determining source;

initiate provisioning of the IoT device cellular network service for the one or more IoT devices;

receive primary location data, generated by the first device location determining source, associated with a first IoT device of the one or more IoT devices;

receive secondary location data, generated by the second device location determining source, associated with the first IoT device; and determine one of a plurality of confidence levels associated with the first IoT device being located at a primary location based on one or more confidence thresholds, the primary location data, and the secondary location data.

16. The non-transitory storage medium of claim 15, wherein the instructions to cause the network device to determine one of the plurality of confidence levels associated with the first IoT device being located at the primary location further comprise instructions to cause the network device to:

determine one of a no confidence, low confidence, or high confidence level that indicates a degree of likelihood that the first IoT device is located at the primary location.

17. The non-transitory storage medium method of claim 16, wherein the no confidence level indicates that it is very likely that the first IoT device is not located at the primary location, wherein the low confidence level indicates that it is not likely that the first IoT device is located at the primary location, and wherein the high confidence level indicates that it is very likely that the first IoT device is located at the primary location.

18. The non-transitory storage medium of claim 15, wherein the cellular network service comprises a low power wide area cellular network service, and wherein the low power wide area cellular network service comprises a Long Term Evolution (LTE) Cat-M1 cellular network service.

19. The non-transitory storage medium of claim 15, wherein the first device location determining source comprises a Global Positioning System (GPS) device, and the second device location determining source comprises a cellular network location determining function or a wireless Local Area Network (LAN) location determining function.

20. The non-transitory storage medium of claim 15, wherein the first device location determining source comprises a cellular network location determining function, and wherein the second device location determining service comprises a wireless Local Area Network (LAN) location determining function.

* * * * *